United States Patent
Doshi et al.

(10) Patent No.: US 11,146,455 B2
(45) Date of Patent: Oct. 12, 2021

(54) END-TO-END QUALITY OF SERVICE IN EDGE COMPUTING ENVIRONMENTS

(71) Applicant: Intel Corporation, Santa Clara, CA (US)

(72) Inventors: Kshitij Arun Doshi, Tempe, AZ (US); Ned M. Smith, Beaverton, OR (US); Francesc Guim Bernat, Barcelona (ES); Timothy Verrall, Pleasant Hill, CA (US); Rajesh Gadiyar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 109 days.

(21) Appl. No.: 16/722,740

(22) Filed: Dec. 20, 2019

(65) Prior Publication Data
US 2020/0136920 A1 Apr. 30, 2020

(51) Int. Cl.
*H04L 12/24* (2006.01)
*H04L 29/08* (2006.01)

(52) U.S. Cl.
CPC ........ *H04L 41/142* (2013.01); *H04L 41/0816* (2013.01); *H04L 41/16* (2013.01); *H04L 67/10* (2013.01)

(58) Field of Classification Search
CPC ..... H04L 41/14–41/16; H04L 41/08–41/0816; H04L 67/10
See application file for complete search history.

(56) References Cited

U.S. PATENT DOCUMENTS

| | | | |
|---|---|---|---|
| 2008/0240150 A1* | 10/2008 | Dias | H04L 41/5003 370/465 |
| 2009/0225762 A1* | 9/2009 | Davidson | H04L 67/32 370/401 |
| 2015/0121371 A1 | 4/2015 | Gummaraju et al. | |

(Continued)

FOREIGN PATENT DOCUMENTS

WO 2018144060 8/2018

OTHER PUBLICATIONS

Salhab et al, "Machine Learning based Resource Orchestration for 5G Network Slices", 2019, IEEE Global Communications Conference (GLOBECOM), pp. 1-6 (Year: 2019).*

(Continued)

*Primary Examiner* — Clayton R Williams
(74) *Attorney, Agent, or Firm* — Schwegman Lundberg & Woessner, P.A.

(57) ABSTRACT

Systems and techniques for end-to-end quality of service in edge computing environments are described herein. A set of telemetry measurements may be obtained for an ongoing dataflow between a device and a node of an edge computing system. A current key performance indicator (KPI) may be calculated for the ongoing dataflow. The current KPI may be compared to a target KPI to determine an urgency value. A set of resource quality metrics may be collected for resources of the network. The set of resource quality metrics may be evaluated with a resource adjustment model to determine available resource adjustments. A resource adjustment may be selected from the available resource adjustments based on an expected minimization of the urgency value. Delivery of the ongoing dataflow may be modified using the selected resource adjustment.

21 Claims, 11 Drawing Sheets

(56) References Cited

U.S. PATENT DOCUMENTS

2018/0275923 A1* 9/2018 Earhart ................. G06F 3/0653
2019/0058638 A1* 2/2019 Ahuja ..................... H04L 45/38
2020/0104184 A1* 4/2020 Subramanian ...... H04L 41/5003

OTHER PUBLICATIONS

Jayaraman, Prem Prakash, "Orchestrating Quality of Service in the Cloud of Things Ecosystem", 2015 IEEE International Symposium on Nanoelectronic and Information Systems, (2015), 6 pgs.

Nallur, Vivek, "A Decentralized Self-Adaptation Mechanism for Service-Based Applications in the Cloud", IEEE Transactions on Software Engineering, (May 2013), 24 pgs.

Taherizadeh, Salman, "Monitoring self-adaptive applications within edge computing frameworks: A state-of-the-art review", Journal of Systems and Software, (Feb. 2018), 21 pgs.

* cited by examiner

END-TO-END QUALITY OF SERVICE IN EDGE COMPUTING ENVIRONMENTS

TECHNICAL FIELD

Embodiments described herein generally relate to data processing, network communication, and communication system implementations, and in particular, to techniques for achieving end-to-end quality of service between an edge computing node and a connected device in edge computing and Internet of Things (IoT) device networks.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog" as powerful computing resources previously available only in large remote data centers are moved closer to endpoints and made available for use by consumers at the "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved.

In a similar manner, Internet of Things (IoT) networks and devices are designed to offer a distributed compute arrangement, from a variety of endpoints. IoT devices are physical or virtualized objects that may communicate on a network, and may include sensors, actuators, and other input/output components, which may be used to collect data or perform actions in a real-world environment. For example, TOT devices may include low-powered endpoint devices that are embedded or attached to everyday things, such as buildings, vehicles, packages, etc., to provide an additional level of artificial sensory perception of those things. Recently, IoT devices have become more popular and thus applications using these devices have proliferated.

The deployment of various Edge, Fog, MEC, and IoT networks, devices, and services have introduced a number of advanced use cases and scenarios occurring at and towards the edge of the network. However, these advanced use cases have also introduced a number of corresponding technical challenges relating to security, processing and network resources, service availability and efficiency, among many other issues. One such challenge is in relation to service availability and efficiency, and the ability to ensure Quality of Service (QoS) in a highly dynamic computing environment. As workloads shift throughout the computing environment, connection quality and other performance metrics may change leading to potential service quality shortcomings.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
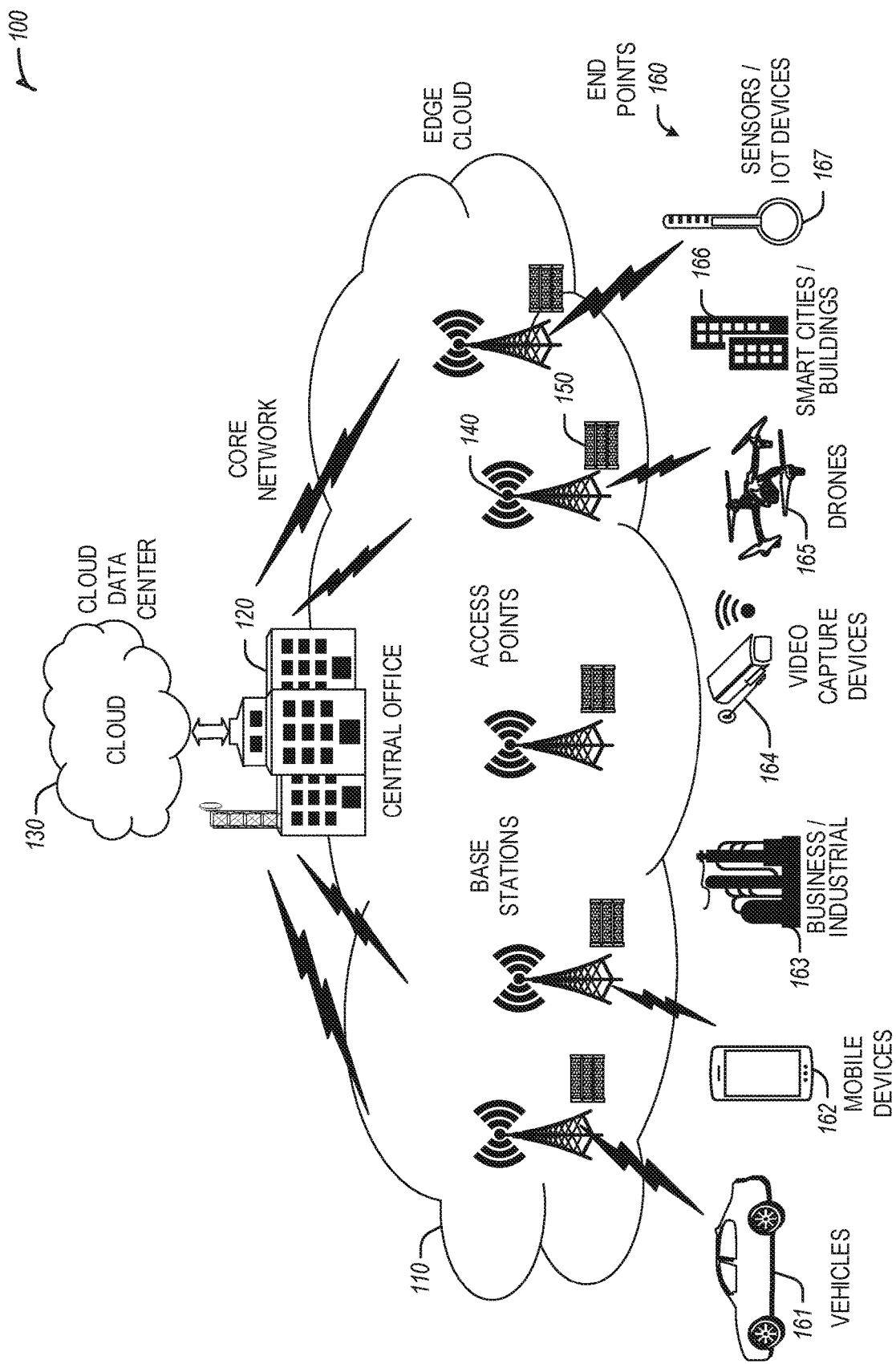
FIG. 1 illustrates an overview of an edge cloud configuration for edge computing, according to an example.

The total flow of interactions among many different edge computing service tasks should be viewed in the context of a co-interested group with quality taken as a whole regardless of which tasks are performed by a telecommunications provider, by a compute provider, a data provider, and so on. This generalized view of service quality is applicable to many data-intensive domains for example, live video streaming, smart cities, time-series processing of power or transportation logistics, distributed health monitoring of people and pets, and so on. The collection of activities often forms a virtual tenant with its execution reflected in the myriad operations of reorganizing data, securing, storing, retrieving data, extracting knowledge, inferring from inputs and shaping responses, and transmitting data or information end-to-end. Large numbers of dynamic demands arise in edge services and there may be limited infrastructure at any given edge computing node. Furnishing tenants of the edge computing system with end-to-end service that meets quality objectives may be difficult as the component tasks within a tenant may be spread across many nodes.

Conventional ad-hoc mechanisms based on various utilities may attempt to maintain a per task P99-latency or a P95-latency per node (e.g., 99 or 95 percentile latency, respectively) and may impose admission control over requests when latencies increase. Other conventional solutions may address complex Quality of Service (QoS) objectives by overprovisioning (e.g., designing the edge computing nodes for over capacity, etc.). QoS may provide clients with fair access to resources of the network. Service level objective (SLOs) may be used to meet application objectives for applications using network resources. Services level agreements (SLAB) may define resources need to achieve an SLO.

Overprovisioning/over-designing raises costs and leads to poor utilization. Current approaches may be piecemeal and limited to per machine, per container, per micro-service, etc. with little ability to prioritize scheduling of resources at exactly the times and at portions of the infrastructure where speed or throughput may be most impacted. Conventional solutions to the issue of providing QoS in an edge computing system may also lack the ability to maximize efficiencies in scheduling when there is sufficient slack. This results in a need to overprovision as well as a lost opportunity to capture slack. Further, even with overprovisioning, conventional solutions may not adapt to technology changes and may not reassess which resources to determine where to redirect new classes of needs or adapt to new opportunities that arise over time.

The systems and techniques discussed herein solve the issue of delivering serves in an edge computing system to meet QoS objectives contractually. A workload meta-model is used iteratively for converging upon a desired end-to-end QoS. The workload meta-model allows for formalization of various relationships between resource assignments and different components of a system of distributed tasks. The rate of convergence is accelerated when the gap between desired QoS and achieved QoS widens. The workload meta-model is also a part of the QoS contract. In an example, the model may provide for compensation so that when end-to-end QoS is prohibitively costly to achieve due to temporary spikes in demand, a higher quality (e.g., higher tier of service) end-to-end service may be offered as compensation for some time in the future, or some other incentive may be delivered to customer of an application using the service. Dedicated resources are provided for executing the workload model and for ensuring that the model execution is furnished with most up to date telemetry.

This approach makes it possible to achieve high levels of automation and greater simplicity in adapting infrastructure on an ongoing basis to meet end-to-end service quality objectives and allows such adaptation under dynamic shifts in demand. Complexity is also reduced by reducing recomputing of various QoS provisions in applications a QoS manager also may not be able to manage. Application developers are also provided with the ability to make self-tuning a part of their implementations.

Example Edge Computing Architectures

FIG. 1 is a block diagram 100 showing an overview of a configuration for edge computing, which includes a layer of processing referenced in many of the current examples as an "edge cloud". This network topology, which may include a number of conventional networking layers (including those not shown herein), may be extended through use of the attestation techniques and network configurations discussed herein.

As shown, the edge cloud 110 is co-located at an edge location, such as the base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer end point devices than at a base station or at a central office). However, the closer that the edge location is to the endpoint (e.g., UEs), the more that space and power is constrained. Thus, edge computing, as a general design principle, attempts to minimize the amount of resources needed for network services, through the distribution of more resources which are located closer both geographically and in network access time.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices.

These and other scenarios may involve the use of attestation, as provided in the discussion below.

In contrast to the network architecture of FIG. 1, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 2:
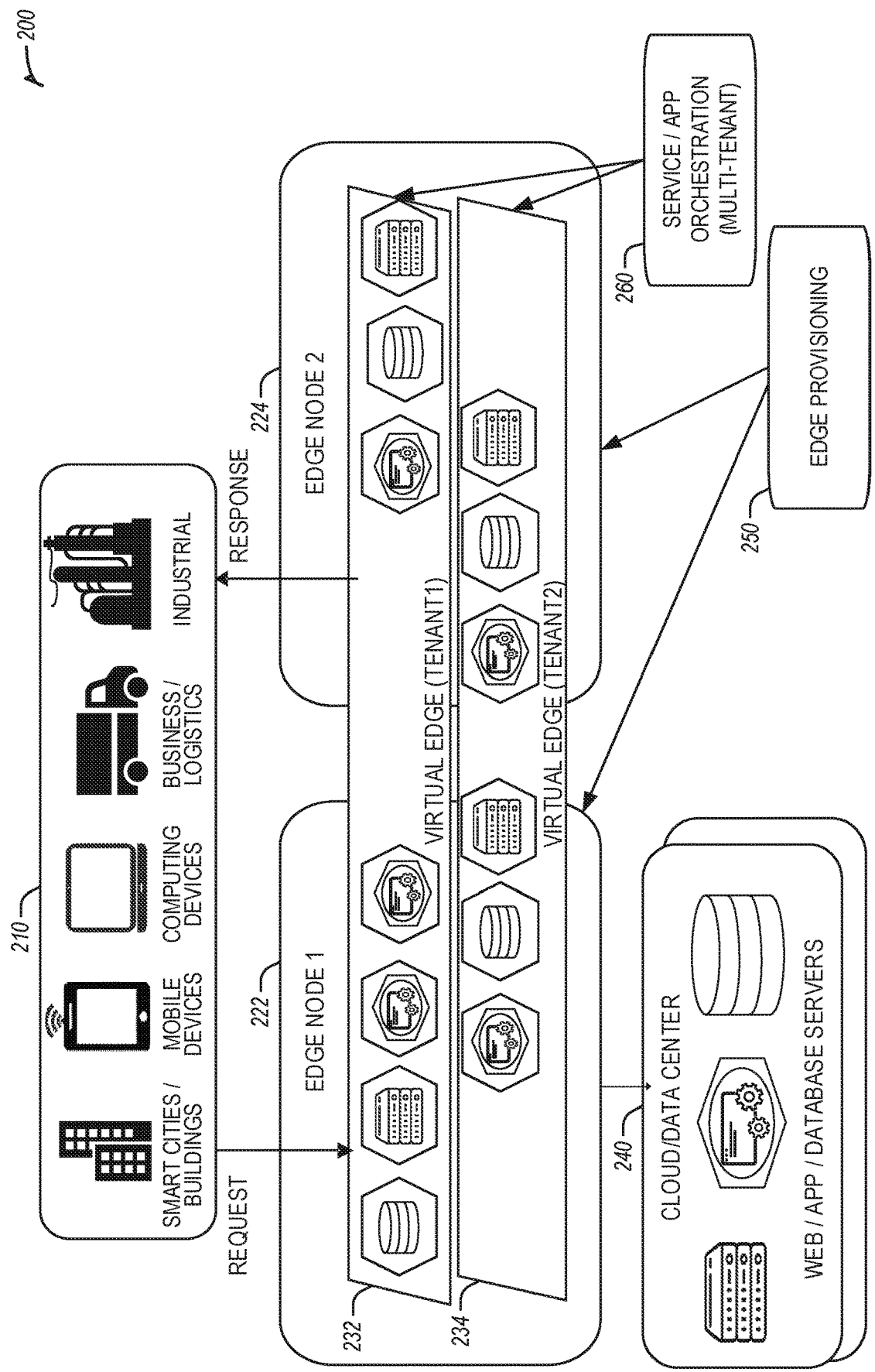
FIG. 2 illustrates deployment and orchestration for virtual edge configurations across an edge computing system operated among multiple edge nodes and multiple tenants, according to an example.

FIG. 2 illustrates deployment and orchestration for virtual edge configurations across an edge computing system operated among multiple edge nodes and multiple tenants. Specifically, FIG. 2 depicts coordination of a first edge node 222 and a second edge node 224 in an edge computing system 200, to fulfill requests and responses for various client endpoints 210 from various virtual edge instances. The virtual edge instances provide edge compute capabilities and processing in an edge cloud, with access to a cloud/data center 240 for higher-latency requests for websites, applications, database servers, etc. Thus, the edge cloud enables coordination of processing among multiple edge nodes for multiple tenants or entities.

In the example of FIG. 2, these virtual edge instances include: a first virtual edge 232, offered to a first tenant (Tenant 1), which offers a first combination of edge storage, computing, and services; and a second virtual edge 234, offering a second combination of edge storage, computing, and services, to a second tenant (Tenant 2). The virtual edge instances 232, 234 are distributed among the edge nodes 222, 224, and may include scenarios in which a request and response are fulfilled from the same or different edge nodes. The configuration of each edge node 222, 224 to operate in a distributed yet coordinated fashion occurs based on edge provisioning functions 250. The functionality of the edge nodes 222, 224 to provide coordinated operation for applications and services, among multiple tenants, occurs based on orchestration functions 260.

It should be understood that some of the devices in 210 are multi-tenant devices where Tenant1 may function within a Tenant1 'slice' while a Tenant2 may function within a Tenant2 slice, A trusted multi-tenant device may further contain a tenant specific cryptographic key such that the combination of key and slice may be considered a "root of trust" (RoT) or tenant-specific RoT. A RoT may further be computed dynamically composed using a security architecture, such as a DICE (Device Identity Composition Engine) architecture where a DICE hardware building block is used to construct layered trusted computing base contexts for layering of device capabilities (such as a Field Programmable Gate Array (FPGA)). The RoT also may be used for a trusted computing context to support respective tenant operations, etc. Use of this RoT and the security architecture may be enhanced by the attestation operations further discussed herein.

Edge computing nodes may partition resources (memory, CPU, GPU, interrupt controller, I/O controller, memory controller, bus controller, etc.) where each partition may contain a RoT capability and where fan-out and layering according to a DICE model may further be applied to edge nodes. Cloud computing nodes consisting of containers, FaaS (function as a service) engines, servlets, servers, or other computation abstraction may be partitioned according to a DICE layering and fan-out structure to support a RoT context for each. Accordingly, the respective RoTs spanning entities 210, 222, and 240 may coordinate the establishment of a distributed trusted computing base (DTCB) such that a tenant-specific virtual trusted secure channel linking all elements end-to-end may be established.

Additionally, the edge computing system may be extended to provide orchestration of multiple applications through the use of containers (a contained, deployable unit of software that provides code and needed dependencies), in a multi-owner, multi-tenant environment. A multi-tenant orchestrator may be used to perform key management, trust anchor management, and other security functions related to the provisioning and lifecycle of the trusted 'slice' concept in FIG. 2. An orchestrator may use a DICE layering and fan-out construction to create a root of trust context that is tenant-specific. Thus, orchestration functions, provided by an orchestrator, may participate as a tenant-specific orchestration provider.

Accordingly, an edge computing system may be configured to fulfill requests and responses for various client endpoints from multiple virtual edge instances (and, from a cloud or remote data center, not shown). The use of these virtual edge instances supports multiple tenants and multiple applications (e.g., AR/VR, enterprise applications, content delivery, gaming, compute offload) simultaneously. Further, there may be multiple types of applications within the virtual edge instances (e.g., normal applications, latency sensitive applications, latency critical applications, user plane applications, networking applications, etc.). The virtual edge instances may also be spanned across systems of multiple owners at different geographic locations.

In further examples, edge computing systems may deploy containers in an edge computing system. As a simplified example, a container manager is adapted to launch containerized pods, functions, and functions-as-a-service instances through execution via compute nodes, or to separately execute containerized virtualized network functions through execution via compute nodes. This arrangement may be adapted for use by multiple tenants in system arrangement, where containerized pods, functions, and functions-as-a-service instances are launched within virtual machines specific to each tenant (aside the execution of virtualized network functions).

Within the edge cloud, a first edge node 222 (e.g., operated by a first owner) and a second edge node 224 (e.g., operated by a second owner) may operate or respond to a container orchestrator to coordinate the execution of various applications within the virtual edge instances offered for respective tenants. For instance, the edge nodes 222, 224 may be coordinated based on edge provisioning functions 250, while the operation of the various applications are coordinated with orchestration functions 260.

Various system arrangements may provide an architecture that treats virtual machines, Containers, and Functions equally in terms of application composition (and resulting applications are combinations of these three ingredients). Each ingredient may involve use of one or more accelerator (e.g., FPGA, ASIC) components as a local backend. In this manner, applications may be split across multiple edge owners, coordinated by an orchestrator.

Figure 3:
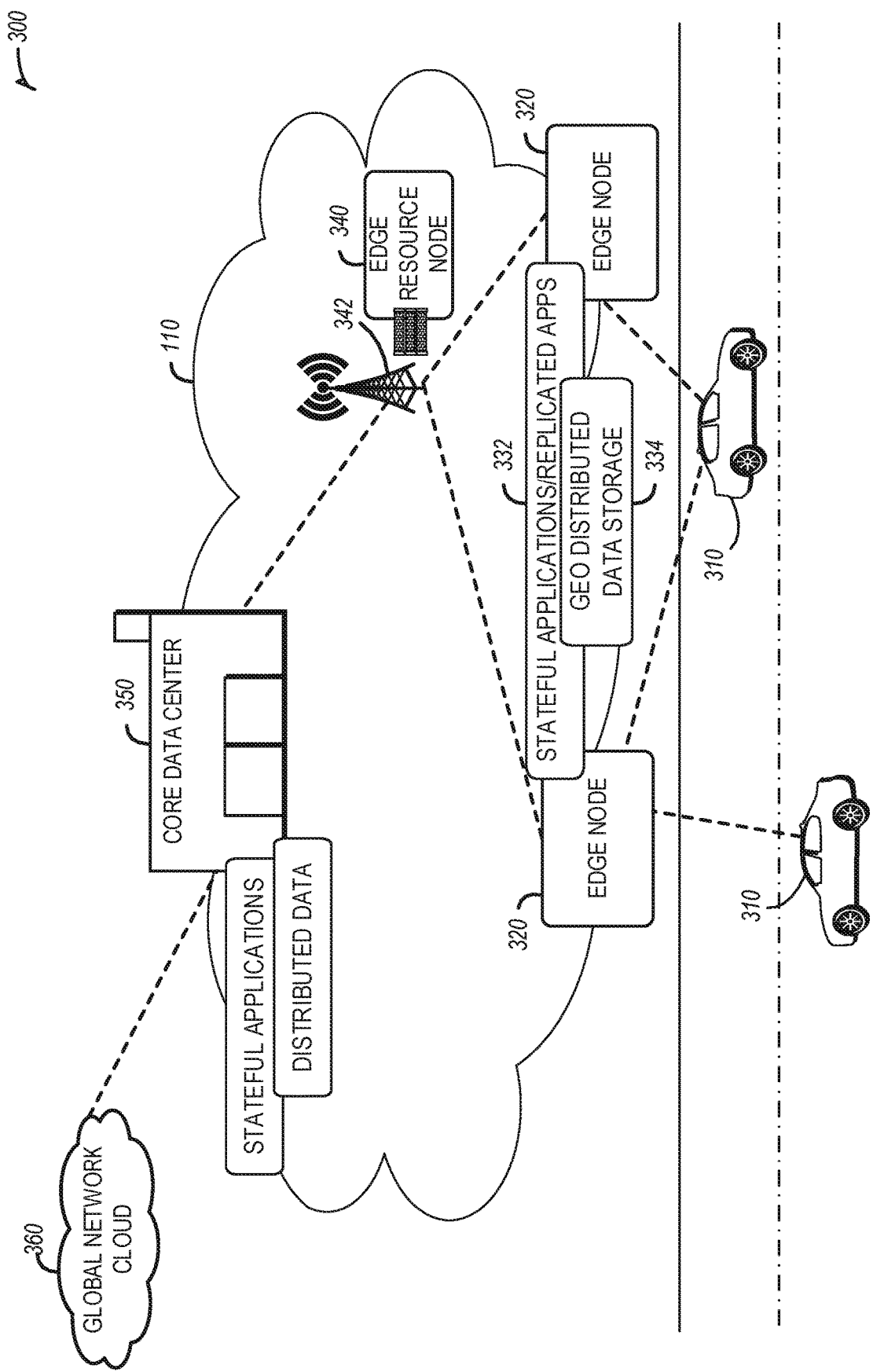
FIG. 3 illustrates a vehicle compute and communication use case involving mobile access to applications in an edge computing system, according to an example.

It should be appreciated that the edge computing systems and arrangements discussed herein may be applicable in various solutions, services, and/or use cases. As an example, FIG. 3 shows a simplified vehicle compute and communication use case involving mobile access to applications in an edge computing system 300 that implements an edge cloud 110. In this use case, each client compute node 310 may be embodied as in-vehicle compute systems (e.g., in-vehicle navigation and/or infotainment systems) located in corresponding vehicles that communicate with the edge gateway nodes 320 during traversal of a roadway. For instance, edge gateway nodes 320 may be located in roadside cabinets, which may be placed along the roadway, at intersections of the roadway, or other locations near the roadway. As each vehicle traverses along the roadway, the connection between its client compute node 310 and a particular edge gateway node 320 may propagate so as to maintain a consistent connection and context for the client compute node 310. Each of the edge gateway nodes 320 includes some processing and storage capabilities and, as such, some processing and/or storage of data for the client compute nodes 310 may be performed on one or more of the edge gateway nodes 320.

Each of the edge gateway nodes 320 may communicate with one or more edge resource nodes 340, which are illustratively embodied as compute servers, appliances or components located at or in a communication base station 342 (e.g., a base station of a cellular network). As discussed above, each edge resource node 340 includes some processing and storage capabilities and, as such, some processing and/or storage of data for the client compute nodes 310 may be performed on the edge resource node 340. For example, the processing of data that is less urgent or important may be performed by the edge resource node 340, while the processing of data that is of a higher urgency or importance may be performed by edge gateway devices or the client nodes themselves (depending on, for example, the capabilities of each component). Further, various wired or wireless communication links (e.g., fiber optic wired backhaul, 5G wireless links) may exist among the edge nodes 320, edge resource node(s) 340, core data center 350, and network cloud 360.

The edge resource node(s) 340 also communicate with the core data center 350, which may include compute servers, appliances, and/or other components located in a central location (e.g., a central office of a cellular communication network). The core data center 350 may provide a gateway to the global network cloud 360 (e.g., the Internet) for the edge cloud 110 operations formed by the edge resource node(s) 340 and the edge gateway nodes 320. Additionally, in some examples, the core data center 350 may include an amount of processing and storage capabilities and, as such, some processing and/or storage of data for the client compute devices may be performed on the core data center 350 (e.g., processing of low urgency or importance, or high complexity). The edge gateway nodes 320 or the edge resource nodes 340 may offer the use of stateful applications 332 and a geographic distributed data storage 334 (e.g., database, data store, etc.).

In further examples, FIG. 3 may utilize various types of mobile edge nodes, such as an edge node hosted in a vehicle (e.g., car, truck, tram, train, etc.) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in a variety of settings, including coordination between some functions or operations at individual endpoint devices or the edge gateway nodes 320, some others at the edge resource node 340, and others in the core data center 350 or global network cloud 360.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS may enable deployment of edge functions in a service fashion, including a support of respective functions that support edge computing as a service. Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require deployment or configuration).

Example Computing Devices

Figure 4:
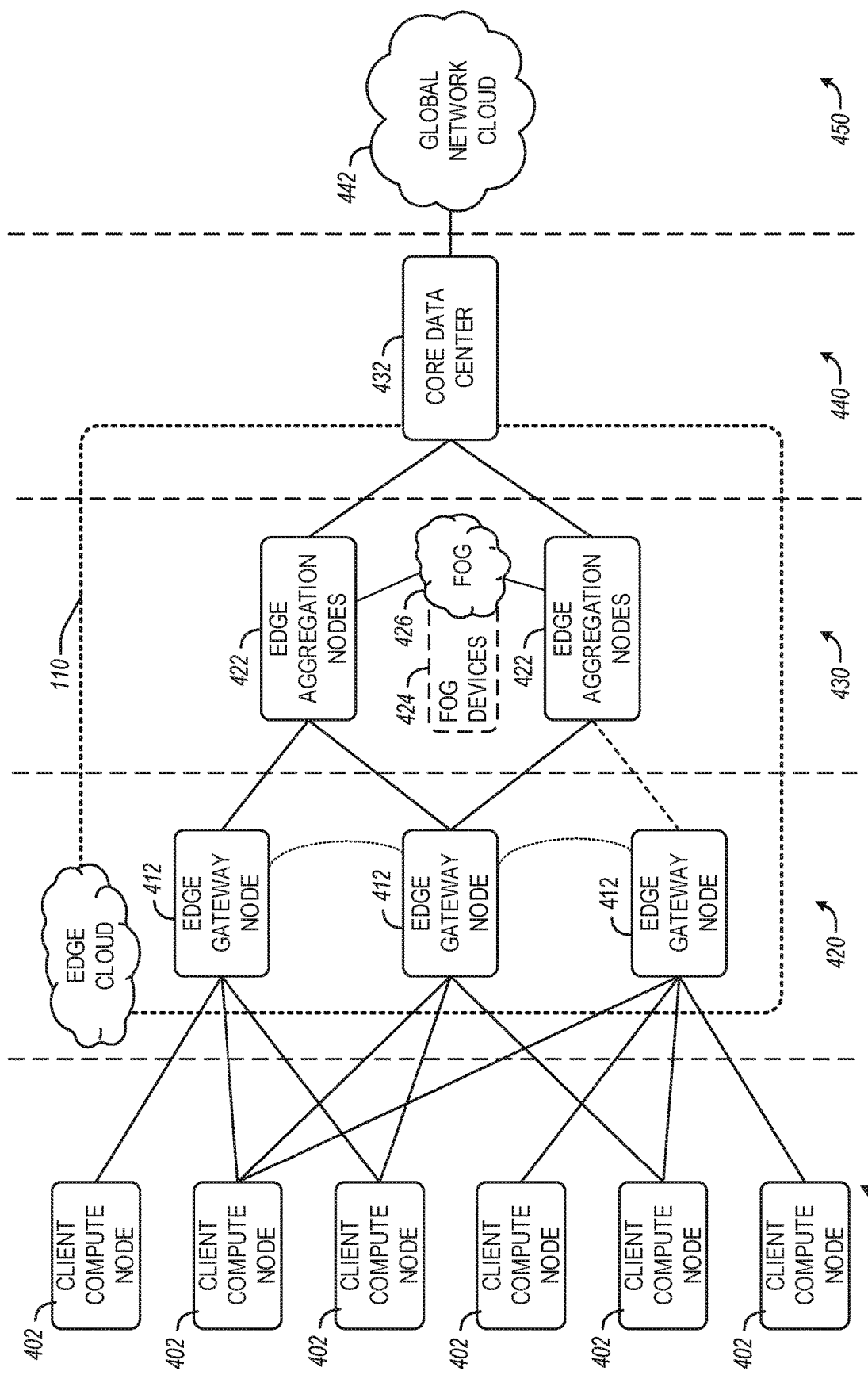
FIG. 4 illustrates an overview of layers of distributed compute deployed among an edge computing system, according to an example.

At a more generic level, an edge computing system may be described to encompass any number of deployments operating in the edge cloud 110, which provide coordination from client and distributed computing devices. FIG. 4 provides a further abstracted overview of layers of distributed compute deployed among an edge computing environment for purposes of illustration.

FIG. 4 generically depicts an edge computing system for providing edge services and applications to multi-stakeholder entities, as distributed among one or more client compute nodes 402, one or more edge gateway nodes 412, one or more edge aggregation nodes 422, one or more core data centers 432, and a global network cloud 442, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities. Various forms of wired or wireless connections may be configured to establish connectivity among the nodes 402, 412, 422, 432, including interconnections among such nodes (e.g., connections among edge gateway nodes 412, and connections among edge aggregation nodes 422).

Each node or device of the edge computing system is located at a particular layer corresponding to layers 410, 420, 430, 440, 450. For example, the client compute nodes 402 are each located at an endpoint layer 410, while each of the edge gateway nodes 412 are located at an edge devices layer 420 (local level) of the edge computing system. Additionally, each of the edge aggregation nodes 422 (and/or fog devices 424, if arranged or operated with or among a fog networking configuration 426) are located at a network access layer 430 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 432 is located at a core network layer 440 (e.g., a regional or geographically-central level), while the global network cloud 442 is located at a cloud data center layer 450 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 432 may be located within, at, or near the edge cloud 110.

Although an illustrative number of client compute nodes 402, edge gateway nodes 412, edge aggregation nodes 422, core data centers 432, global network clouds 442 are shown in FIG. 4, it should be appreciated that the edge computing system may include more or fewer devices or systems at each layer. Additionally, as shown in FIG. 4, the number of components of each layer 410, 420, 430, 440, 450 generally increases at each lower level (i.e., when moving closer to endpoints). As such, one edge gateway node 412 may service multiple client compute nodes 402, and one edge aggregation node 422 may service multiple edge gateway nodes 412.

Consistent with the examples provided herein, each client compute node 402 may be embodied as any type of end point component, device, appliance, or "thing" capable of communicating as a producer or consumer of data. Further, the label "node" or "device" as used in the edge computing system 400 does not necessarily mean that such node or device operates in a client or slave role; rather, any of the nodes or devices in the edge computing system 400 refer to individual entities, nodes, or subsystems which include discrete or connected hardware or software configurations to facilitate or use the edge cloud 110.

As such, the edge cloud 110 is formed from network components and functional features operated by and within the edge gateway nodes 412 and the edge aggregation nodes 422 of layers 420, 430, respectively. The edge cloud 110 may be embodied as any type of network that provides edge computing and/or storage resources which are proximately located to radio access network (RAN) capable endpoint devices (e.g., mobile computing devices, IoT devices, smart devices, etc.), which are shown in FIG. 4 as the client compute nodes 402. In other words, the edge cloud 110 may be envisioned as an "edge" which connects the endpoint devices and traditional mobile network access points that serves as an ingress point into service provider core networks, including carrier networks Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 110 may form a portion of or otherwise provide an ingress point into or across a fog networking configuration 426 (e.g., a network of fog devices 424, not shown in detail), which may be embodied as a system-level horizontal and distributed architecture that distributes resources and services to perform a specific function. For instance, a coordinated and distributed network of fog devices 424 may perform computing, storage, control, or networking aspects in the context of an IoT system arrangement. Other networked, aggregated, and distributed functions may exist in the edge cloud 110 between the cloud data center layer 450 and the client endpoints (e.g., client compute nodes 402). Some of these are discussed in the following sections in the context of network functions or service virtualization, including the use of virtual edges and virtual services which are orchestrated for multiple stakeholders.

The edge gateway nodes 412 and the edge aggregation nodes 422 cooperate to provide various edge services and security to the client compute nodes 402. Furthermore, because each client compute node 402 may be stationary or mobile, each edge gateway node 412 may cooperate with other edge gateway devices to propagate presently provided edge services and security as the corresponding client compute node 402 moves about a region. To do so, each of the edge gateway nodes 412 and/or edge aggregation nodes 422 may support multiple tenancy and multiple stakeholder configurations, in which services from (or hosted for) multiple service providers and multiple consumers may be supported and coordinated across a single or multiple compute devices.

In various examples, the present attestation techniques may be implemented among the client compute nodes 402 (e.g., at a client who receives an attestation token), at the edge gateway nodes 412 or aggregation nodes 422 (e.g., at a resource node which has a resource to be attested), and other intermediate nodes in the edge cloud 110 (e.g., which operate orchestrator functions, attestation service functions, etc.), as further discussed below with reference to FIGS. 8 and 9.

In further examples, any of the compute nodes or devices discussed with reference to the present edge computing systems and environment may be fulfilled based on the components depicted in FIGS. 5A and 5B. Each edge compute node may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

Figure 5A:
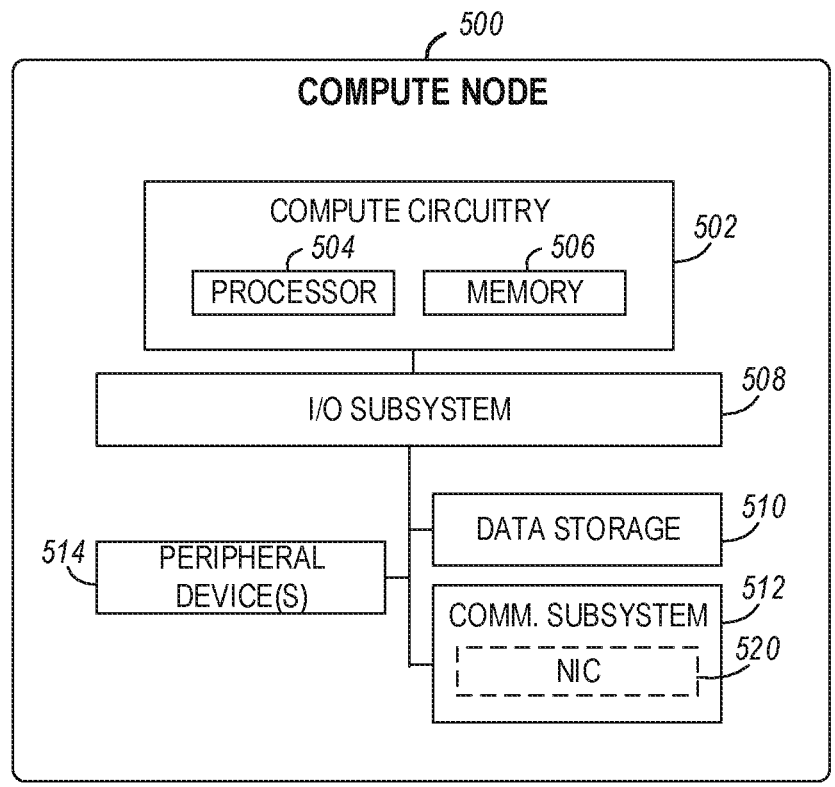
FIG. 5A illustrates an overview of example components deployed at a compute node system, according to an example.

In the simplified example depicted in FIG. 5A, an edge compute node 500 includes a compute engine (also referred to herein as "compute circuitry") 502, an input/output (I/O) subsystem 508, data storage 510, a communication circuitry subsystem 512, and, optionally, one or more peripheral devices 514. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 500 may be embodied as any type of engine, device, or collection of devices capable of performing various compute functions. In some examples, the compute node 500 may be embodied as a single device such as an integrated circuit, an embedded system, a field-programmable gate array (FPGA), a system-on-a-chip (SOC), or other integrated system or device. In the illustrative example, the compute node 500 includes or is embodied as a processor 504 and a memory 506. The processor 504 may be embodied as any type of processor capable of performing the functions described herein (e.g., executing an application). For example, the processor 504 may be embodied as a multi-core processor(s), a microcontroller, or other processor or processing/controlling circuit. In some examples, the processor 504 may be embodied as, include, or be coupled to an FPGA, an application specific integrated circuit (ASIC), reconfigurable hardware or hardware circuitry, or other specialized hardware to facilitate performance of the functions described herein.

The main memory 506 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 506 may be integrated into the processor 504. The main memory 506 may store various software and data used during operation such as one or more applications, data operated on by the application(s), libraries, and drivers.

The compute circuitry 502 is communicatively coupled to other components of the compute node 500 via the I/O subsystem 508, which may be embodied as circuitry and/or components to facilitate input/output operations with the compute circuitry 502 (e.g., with the processor 504 and/or the main memory 506) and other components of the compute circuitry 502. For example, the I/O subsystem 508 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 508 may form a portion of a system-on-a-chip (SoC) and be incorporated, along with one or more of the processor 504, the main memory 506, and other components of the compute circuitry 502, into the compute circuitry 502.

The one or more illustrative data storage devices 510 may be embodied as any type of devices configured for short-term or long-term storage of data such as, for example, memory devices and circuits, memory cards, hard disk drives, solid-state drives, or other data storage devices. Each data storage device 510 may include a system partition that stores data and firmware code for the data storage device 510. Each data storage device 510 may also include one or more operating system partitions that store data files and executables for operating systems depending on, for example, the type of compute node 500.

The communication circuitry 512 may be embodied as any communication circuit, device, or collection thereof, capable of enabling communications over a network between the compute circuitry 502 and another compute device (e.g., an edge gateway node 412 of the edge computing system 400). The communication circuitry 512 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to effect such communication.

The illustrative communication circuitry 512 includes a network interface controller (NIC) 520, which may also be referred to as a host fabric interface (HFI). The NIC 520 may be embodied as one or more add-in-boards, daughter cards, network interface cards, controller chips, chipsets, or other devices that may be used by the compute node 500 to connect with another compute device (e.g., an edge gateway node 412). In some examples, the NIC 520 may be embodied as part of a system-on-a-chip (SoC) that includes one or more processors, or included on a multichip package that also contains one or more processors. In some examples, the NIC 520 may include a local processor (not shown) and/or a local memory (not shown) that are both local to the NIC 520. In such examples, the local processor of the NIC 520 may be capable of performing one or more of the functions of the compute circuitry 502 described herein. Additionally or alternatively, in such examples, the local memory of the NIC 520 may be integrated into one or more components of the client compute node at the board level, socket level, chip level, and/or other levels.

Additionally, in some examples, each compute node 500 may include one or more peripheral devices 514. Such peripheral devices 514 may include any type of peripheral device found in a compute device or server such as audio input devices, a display, other input/output devices, interface devices, and/or other peripheral devices, depending on the particular type of the compute node 500. In further examples, the compute node 500 may be embodied by a respective edge compute node in an edge computing system (e.g., client compute node 402, edge gateway node 412, edge aggregation node 422) or like forms of appliances, computers, subsystems, circuitry, or other components.

Figure 5B:
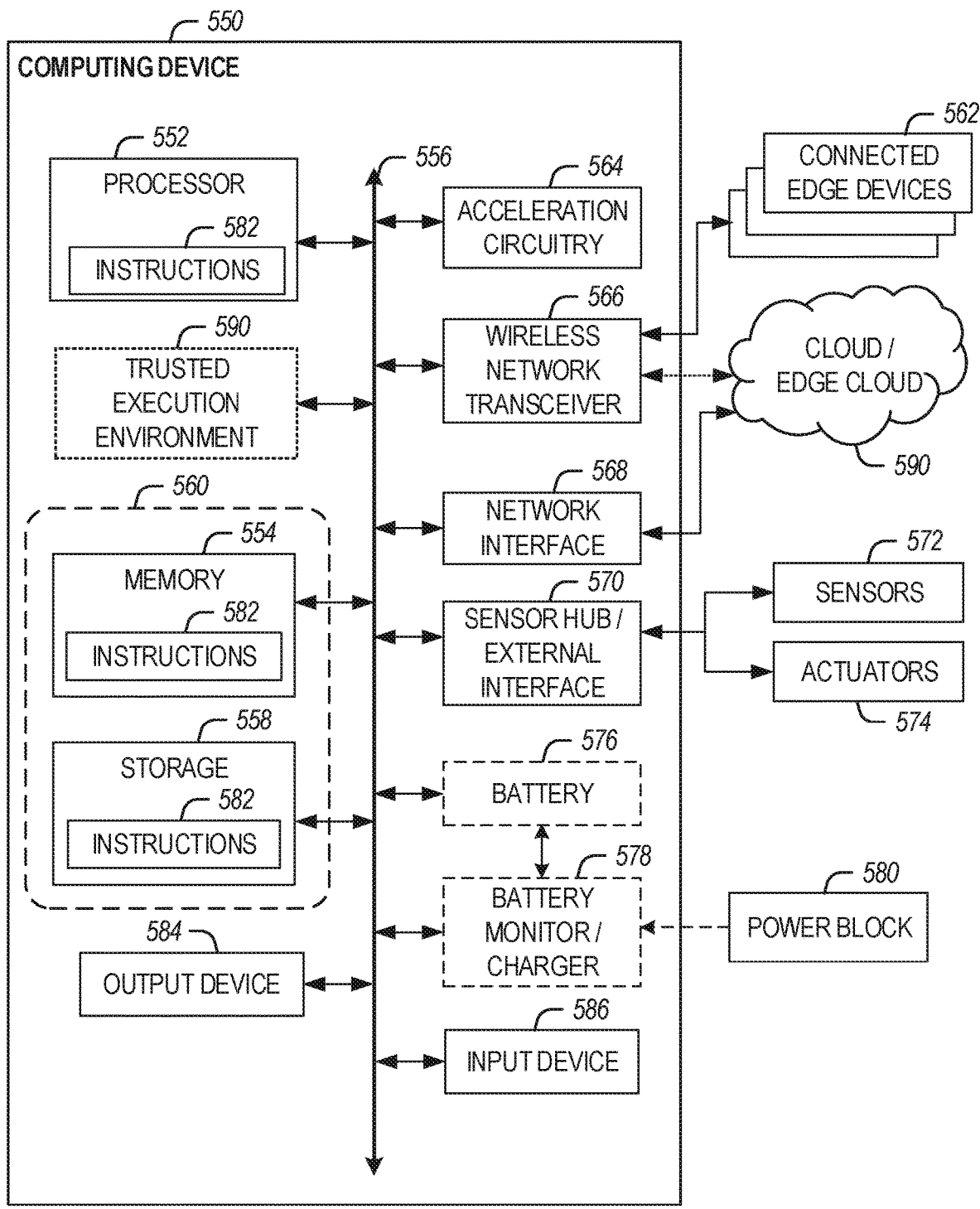
FIG. 5B illustrates a further overview of example components within a computing device, according to an example.

In a more detailed example, FIG. 5B illustrates a block diagram of an example of components that may be present in an edge computing node 550 for implementing the techniques operations, processes, methods, and methodologies) described herein. The edge computing node 550 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 550, or as components otherwise incorporated within a chassis of a larger system.

The edge computing node 550 may include processing circuitry in the form of a processor 552, which may be a microprocessor, a multi-core processor, a multithreaded processor, an ultra-low voltage processor, an embedded processor, or other known processing elements. The processor 552 may be a part of a system on a chip (SoC) in which the processor 552 and other components are formed into a single integrated circuit, or a single package, such as the Edison™ or Galileo™ SoC hoards from Intel Corporation, Santa Clara, Calif. As an example, the processor 552 may include an Intel® Architecture Core™ based processor, such as a Quark™, an Atom™, an i3, an i5, an i7, an i9, or an MCU-class processor, or another such processor available from Intel®. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or a customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 552 may communicate with a system memory 554 over an interconnect 556 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 558 may also couple to the processor 552 via the interconnect 556. In an example, the storage 558 may be implemented via a solid-state disk drive (SSDD). Other devices that may be used for the storage 558 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magneto-resistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 558 may be on-die memory or registers associated with the processor 552. However, in some examples, the storage 558 may be implemented using a micro hard disk drive (HDD). Further, any number of new technologies may be used for the storage 558 in addition to, or instead of, the technologies described, such resistance change memories, phase change memories, holographic memories, or chemical memories, among others.

The components may communicate over the interconnect 556. The interconnect 556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 556 may be a proprietary bus, for example, used in an SoC based system. Other bus systems may be included, such as an I2C interface, an SPI interface, point to point interfaces, and a power bus, among others.

The interconnect 556 may couple the processor 552 to a transceiver 566, for communications with the connected edge devices 562. The transceiver 566 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 562. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 566 (or multiple transceivers) may communicate using multiple standards or radios for communications at a different range. For example, the edge computing node 550 may communicate with close devices, e.g., within about 10 meters, using a local transceiver based on BLE, or another low power radio, to save power. More distant connected edge devices 562, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 566 (e.g., a radio transceiver) may be included to communicate with devices or services in the edge cloud 590 via local or wide area network protocols. The wireless network transceiver 566 may be an LPWA transceiver that follows the IEEE 802.15.4, or IEEE 802.15.4g standards, among others. The edge computing node 550 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 566, as described herein. For example, the transceiver 566 may include a cellular transceiver that uses spread spectrum (SPA/SAS) communications for implementing high-speed communications. Further, any number of other protocols may be used, such as Wi-Fi® networks for medium speed communications and provision of network communications. The transceiver 566 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 568 may be included to provide a wired communication to nodes of the edge cloud 590 or to other devices, such as the connected edge devices 562 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 568 may be included to enable connecting to a second network, for example, a first NIC 568 providing communications to the cloud over Ethernet, and a second NIC 568 providing communications to other devices over another type of network.

Given the variety of types of applicable communications from the device to another component or network, applicable communications circuitry used by the device may include or be embodied by any one or more of components 564, 566, 568, or 570. Accordingly, in various examples, applicable means for communicating (e.g., receiving, transmitting, etc.) may be embodied by such communications circuitry.

The edge computing node 550 may include or be coupled to acceleration circuitry 564, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 556 may couple the processor 552 to a sensor hub or external interface 570 that is used to connect additional devices or subsystems. The devices may include sensors 572, such as accelerometers, level sensors, flow sensors, optical light sensors, camera sensors, temperature sensors, a global positioning system (UPS) sensors, pressure sensors, barometric pressure sensors, and the like. The hub or interface 570 further may be used to connect the edge computing node 550 to actuators 574, such as power switches, valve actuators, an audible sound generator, a visual warning device, and the like.

In some optional examples, various input/output (I/O) devices may be present within or connected to, the edge computing node 550. For example, a display or other output device 584 may be included to show information, such as sensor readings or actuator position. An input device 586, such as a touch screen or keypad may be included to accept input. An output device 584 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 550.

A battery 576 may power the edge computing node 550, although, in examples in which the edge computing node 550 is mounted in a fixed location, it may have a power supply coupled to an electrical grid. The battery 576 may be a lithium ion battery, or a metal-air battery, such as a zinc-air battery, an aluminum-air battery, a lithium-air battery, and the like.

A battery monitor/charger 578 may be included in the edge computing node 550 to track the state of charge (SoCh) of the battery 576. The battery monitor/charger 578 may be used to monitor other parameters of the battery 576 to provide failure predictions, such as the state of health (SoH) and the state of function (SoF) of the battery 576. The battery monitor/charger 578 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 578 may communicate the information on the battery 576 to the processor 552 over the interconnect 556. The battery monitor/charger 578 may also include an analog-to-digital (ADC) converter that enables the processor 552 to directly monitor the voltage of the battery 576 or the current flow from the battery 576. The battery parameters may be used to determine actions that the edge computing node 550 may perform, such as transmission frequency, mesh network operation, sensing frequency, and the like.

A power block 580, or other power supply coupled to a grid, may be coupled with the battery monitor/charger 578 to charge the battery 576. In some examples, the power block 580 may be replaced with a wireless power receiver to obtain the power wirelessly, for example, through a loop antenna in the edge computing node 550. A wireless battery charging circuit, such as an LTC4020 chip from Linear Technologies of Milpitas, Calif., among others, may be included in the battery monitor/charger 578. The specific charging circuits may be selected based on the size of the battery 576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 558 may include instructions 582 in the form of software, firmware, or hardware commands to implement the techniques described herein. Although such instructions 582 are shown as code blocks included in the memory 554 and the storage 558, it may be understood that any of the code blocks may be replaced with hardwired circuits, for example, built into an application specific integrated circuit (ASIC). Accordingly, in various examples, applicable means for storage may be embodied by such storage circuitry.

In an example, the instructions 582 provided via the memory 554, the storage 558, or the processor 552 may be embodied as a non-transitory, machine-readable medium 560 including code to direct the processor 552 to perform electronic operations in the edge computing node 550. The processor 552 may access the non-transitory, machine-readable medium 560 over the interconnect 556. Accordingly, in various examples, applicable means for processing may be embodied by such processor circuitry. For instance, the non-transitory, machine-readable medium 560 may be embodied by devices described for the storage 558 or may include specific storage units such as optical disks, flash drives, or any number of other hardware devices. The non-transitory, machine-readable medium 560 may include instructions to direct the processor 552 to perform a specific sequence or flow of actions, for example, as described with respect to the flowchart(s) and block diagram(s) of operations and functionality depicted above. As used in, the terms "machine-readable medium" and "computer-readable medium" are interchangeable. Accordingly, in various examples, applicable means for memory may be embodied by such memory circuitry.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 5A and 5B are intended to depict a high-level view of components of a device, subsystem, or arrangement of an edge computing node. However, it will be understood that some of the components shown may be omitted, additional components may be present, and a different arrangement of the components shown may occur in other implementations.

Figure 6:
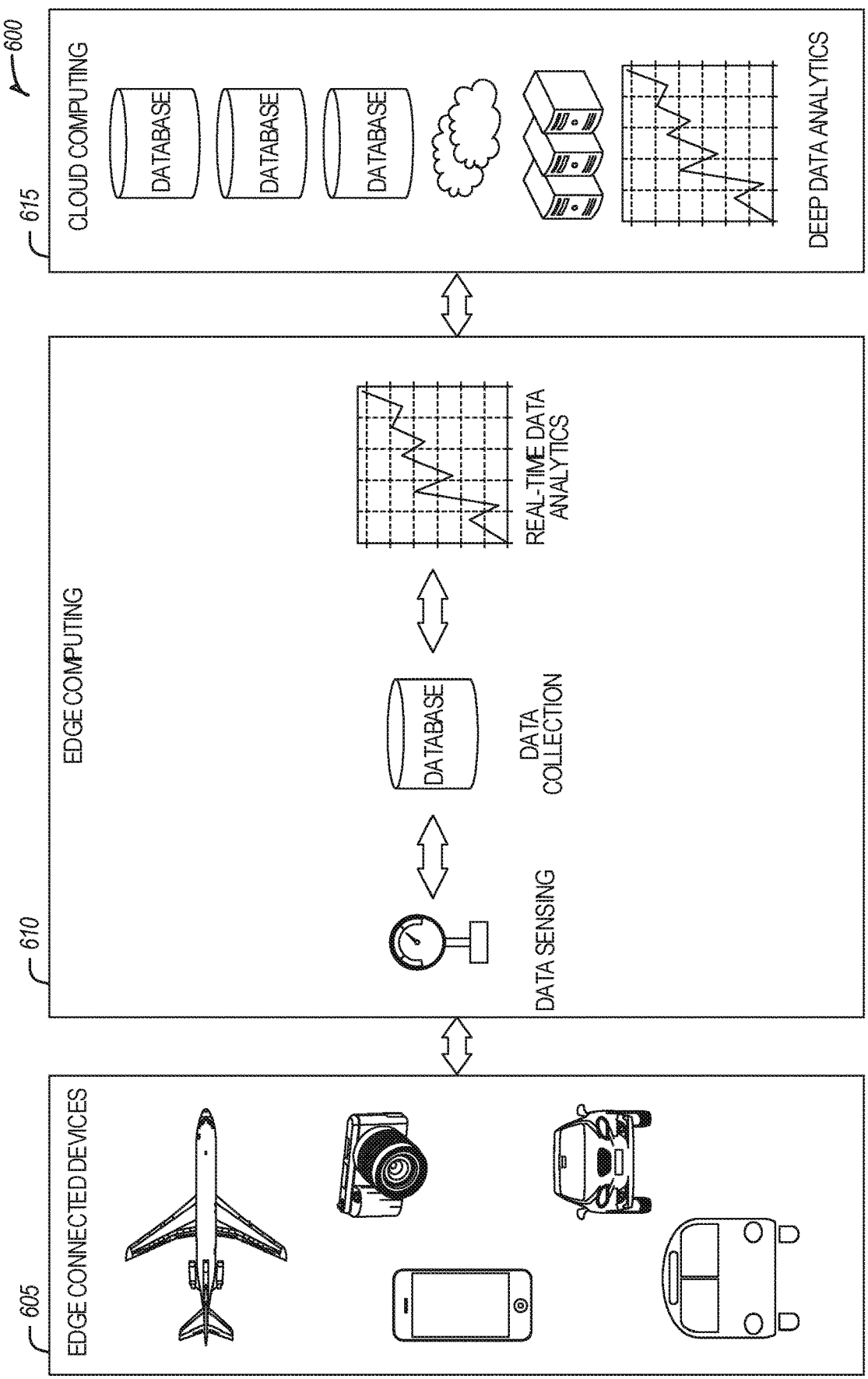
FIG. 6 illustrates an overview of an example of three tier computation and data processing with an edge computing platform as a middle tier, according to an example.

FIG. 6 illustrates an overview of an example of three tier computation and data processing 600 with an edge computing platform as a middle tier 610, according to an example. Computing in edge clouds is highly decentralized. It is emerging as a special category of operations in which events, requests, and data streams are processed in a manner that should lead to low and deterministic latency responses. Edge connected devices in the first tier 605 may produce and consume a variety of data. In the middle tier 610, many different edge computing, communication, and storage resources are aggregated flexibly and dynamically in hierarchical or peer-to-peer relationships for meeting response-time and communication bandwidth for critical needs locally. The middle tier 610 may mobilize deeper and richer resource networks in traditional clouds in the third tier 615 for complex computation intensive operations.

Figure 7:
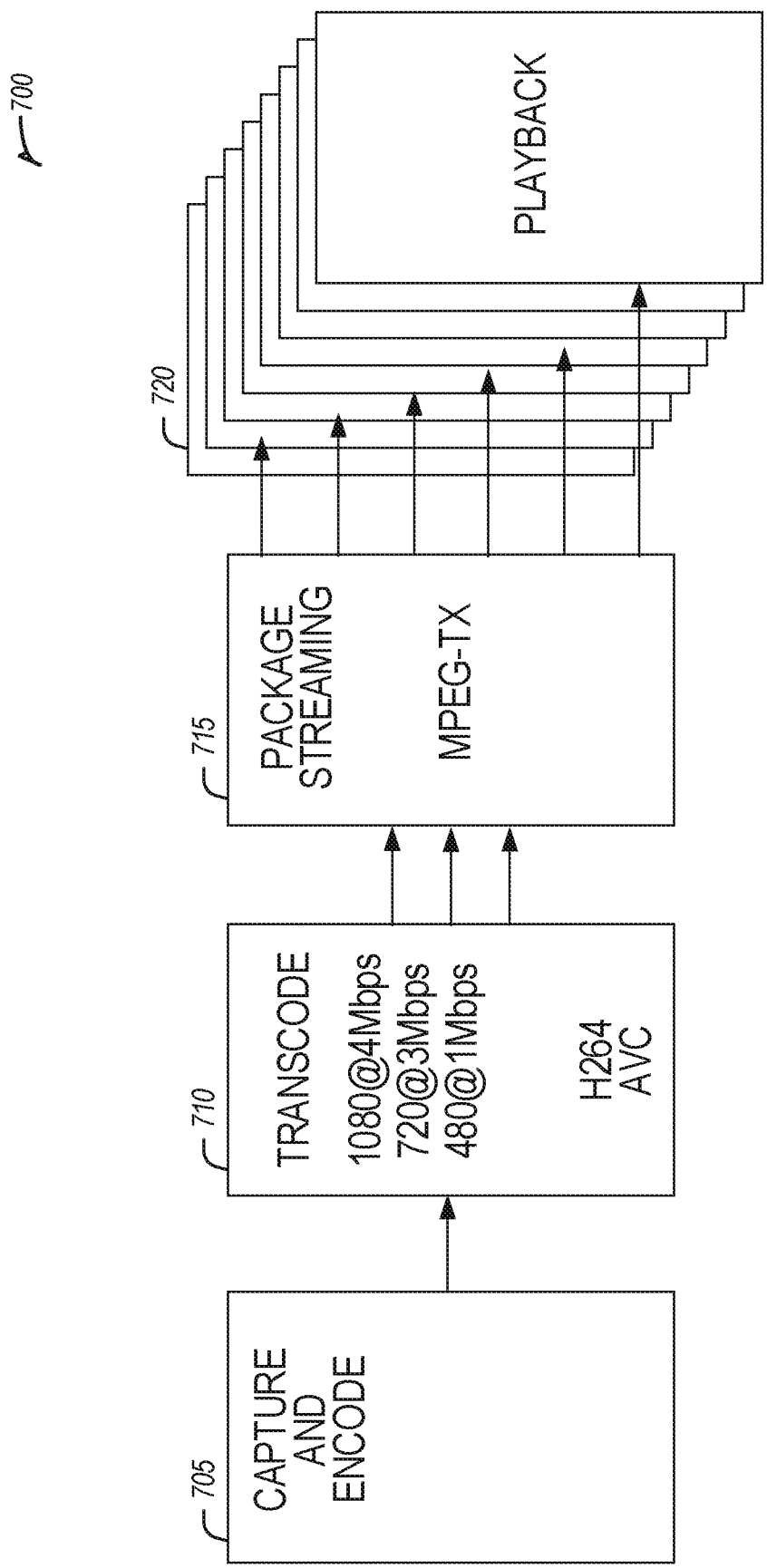
FIG. 7 illustrates an example of a live video streaming application pipeline, according to an example.

FIG. 7 illustrates an example of a live video streaming application pipeline 700, according to an example. Live Video Streaming (LVS) may illustrate the demands for dataflows in an edge computing system, but the systems and techniques discussed herein are equally applicable to a variety of dataflow use cases in an edge computing system. The systems and techniques discussed herein achieve stringent service quality objectives as experienced by distributed, decentralized applications. LVS and other demanding workloads are becoming increasingly popular due to advances in networking technologies and provide a good example of the problem presented by data-intensive workloads in an edge computing system. In LVS, a device equipped with one or more cameras captures video and streams it in near real-time to large audiences. To do this, video is captured and encoded 705. Capturing and encoding 705 may be performed using device capabilities or by, employing a small server to which the device is connected. The video is then transcoded 710 and packaged 715 for streaming. Transcoding 710 produces streams in different resolutions and bitrates in real time from the capture and encoding 705 input stream. Packaging 715 operations adapts the video for different streaming protocols suitable for a wide range of network/location/playback device specifications and across broadly distributed audiences.

User engagement becomes critically impacted by the time it takes to start playing the video after a player initiates a connection to a video server (e.g., join time), the percent of total streaming session time spent in buffering (e.g., buffering ratio), and quality of video. All three metrics are directly affected by transcoding 710 and packaging 715 steps. While using elasticity of a fully equipped (e.g., resource rich) backend cloud may be an option today, growing resolutions (e.g., 8K resolution, etc.) and very rich content—particularly for immersive video—make it important to situate many of these operations very close to the edge where they are distributed and decentralized across many different parts of the infrastructure. Popular content may also be cached and dynamically adapted in real time to, for example, meet content personalization goals. Some kinds of content may be cached in an edge provider's infrastructure and other types of content may be better cached and redistributed from an application provider's content distribution and specialization network.

In an example, different edge service providers split the encoding 705, transcoding 710, and packaging 715 and many other operations to various compute nodes throughout the network infrastructure. For example, an application provider may lease computation and storage from an edge services provider, a CDN provider may lease communication and routing services from base stations owned by an edge infrastructure provider to capitalize on the latter's networking strengths, and the CDN provider may situate specialized appliances in a colocation facility at an edge point of presence for offloading the more demanding parts of their services and have a content syndication model for augmenting an edge provider's services. These are operations that may arise in revenue generating and/or bundled services, for example, in INS from sports venues, entertainment venues, and various types of business content services. Such operations may include streaming, metering, charging, and in production of associated dynamic content that may require filtering, blending, indexing, translating, and many other in-the-flow operations. Quality of user engagement must be achieved by close coordination among all these operations.

Figure 8:
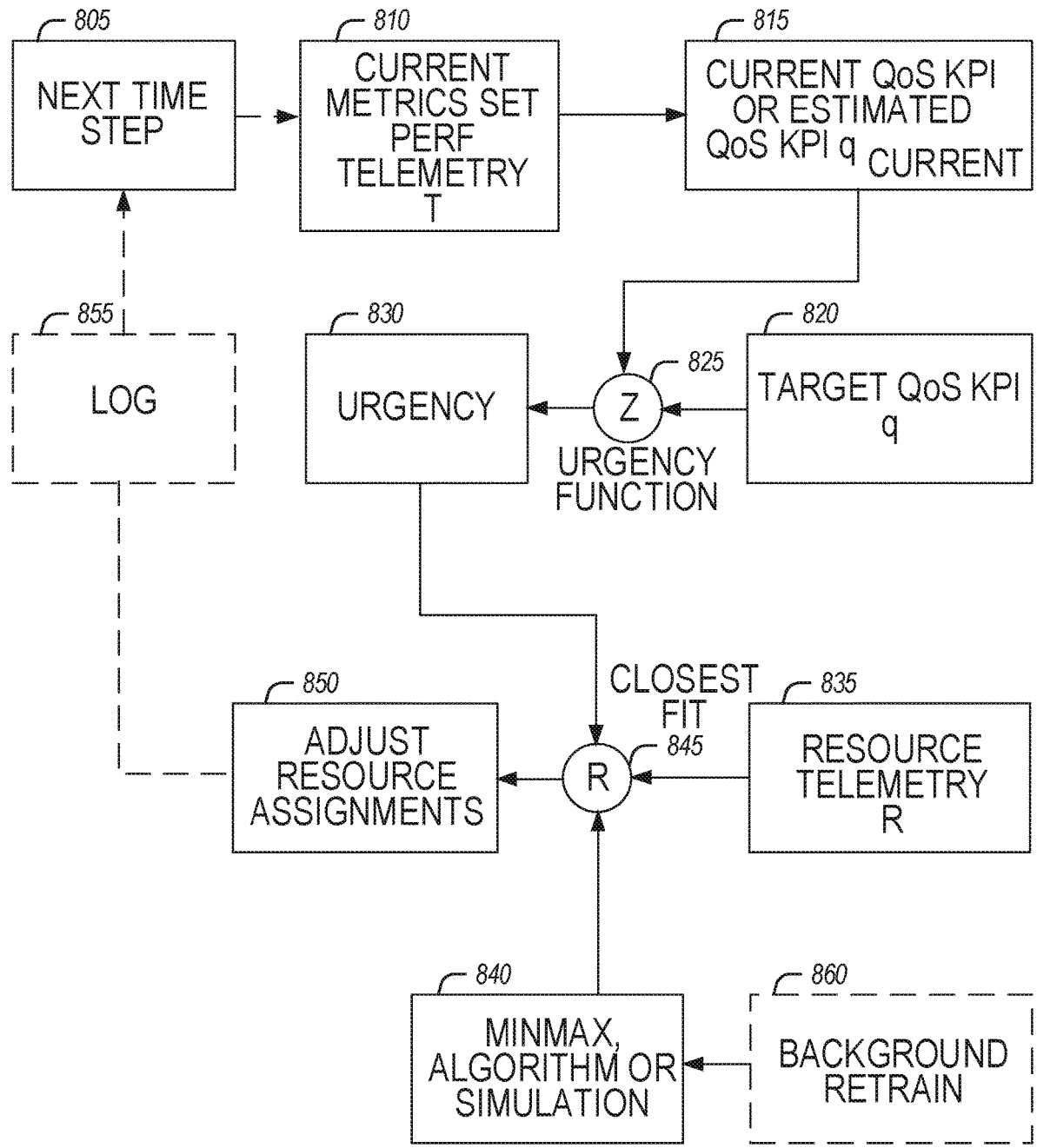
FIG. 8 illustrates an example of a process for end-to-end quality of service in edge computing environments, according to an example.

FIG. 8 illustrates an example of a process 800 for end-to-end quality, of service in edge computing environments, according to an example.

In terms of telemetry, metrics may be collected for a hardware object, a system software object, or a system of objects that may include a variety of resources such as computation, communication, memory, accelerators, and storage resources. Each resource may be physical or virtualized. Examples disclosed herein improve distribution of computing tasks to edge services based on telemetry data. The telemetry data may be generated by object(s) associated with resource(s) (e.g., hardware resource(s), software resource(s), etc., and/or a combination thereof). As used herein, the term "object" refers to a logical block of machine-readable definitions, data structures, instructions, etc., and/or a physical block (e.g., a block or portion of memory and/or storage) including the logical block. The logical block may implement a function, an interface, and/or otherwise a machine-readable model or representation of a resource. A logical block may refer to code (e.g., human-readable code, machine-readable code, etc.) that may be written so that the object may monitor a partition, a portion, a slice, etc., of the resource. For example, an object may be implemented using compiled object code, source code, etc., that, when executed, may expose one or more object interfaces to a software stack (e.g., a platform software stack, a system software stack, etc.). In such examples, the one or more object interfaces, when invoked, may provide and/or otherwise expose telemetry data generated by and/or otherwise associated with a resource. For example, the telemetry data may include a tracking of the execution of one or more processes, services, etc., of the resource.

In an example, some resources may provide a direct service where the exercise of the resource produces a desired computation or communication or storage outcome while other resources may provide an indirect service such as security (e.g., verifying and/or enforcing authorized access), resiliency (e.g., facilitation of debugging, tracing, repairing), etc. Various measurements regarding its utilization, average delay in receiving the service latency), average rate at which service is available (e.g., throughput), power expenditure, etc. may be obtained either through event metrics provided directly by the implementation (e.g., hardware, software, or virtualized hardware/software) of the resource or inferred on the basis of derivable observations. For example, latency may be obtained by tracing or random sampling over the actions or steps performed by the object/system. Collectively, these metrics may be referred to as the telemetry associated with the object or system. A resources metrics set is indicated as R in FIG. 8.

A time step is processed at operation 805 and tenant end-to-end metrics set (TEEMS) is collected and is denoted as T in FIG. 8. T, or TEEMS, is associated with a matrix of task-associated metrics. A tenant of the network tray have multiple services. The metrics may be gathered per service per tenant. Each row such as row k in this matrix refers to a single task $A_k$, $1 \leq k \leq M$. Columns in this matrix refer to various performance figures of merit (e.g., reciprocal of latency per request, throughput/rate at which that task or function, $A_k$, is performing, etc.). The two sources of telemetry, R and T are taken into account in operation 810 and operation 835, respectively.

The process 800 may be performed in approximate (e.g., soft) synchronization by capitalizing on Time-Sensitive Networking (TSN). Application telemetry across components, tasks, functions, and microservices is drawn across the distributed edge infrastructure at operation 810. Similarly, resource telemetry is drawn and shared with different parts of the edge infrastructure at operation 835. The TEEMS telemetry is mapped to a current summary evaluation of a SLO Key Performance Indicator (KPI), $q_{current\ at}$ operation 815. The variable $q_{current}$ may be considered a projection from T onto an end-to-end engagement KPI as defined by an application-provided or service-provided mapping. The mapping to $q_{current}$ is, in general, a non-linear or complex function of T and may be computed by a small Artificial Neural Network (ANN) or a software procedure or by a Field Programmable Gate Array (FPGA), Configurable Spatial Accelerator (CSA), etc. The mapping to $q_{current}$ is compared with a desired QoS level, q at operation 820. An overall level of urgency is derived in in operation 830 through the agency of a mapping function Z at operation 825. The greater the gap between current end-to-end quality metric $q_{current}$ of an application and its intended performance state q, the greater the urgency. While $q_{current}$ and q may be vector valued entities (i.e., a QoS may be in more than one dimension), the urgency metric may be a scalar that reflects the amount of stress or how rapidly the gap between $q_{current}$ and q needs to be closed.

Machine Learning (ML) and Artificial intelligence (AI) may be used to better estimate QoS KPI. It may operate independently of the resource allocation estimation at operation 840 and may provide inputs to the estimation function itself. In an example, the estimation function may be based on a Neural Network (NN) (e.g., a reinforced NN, etc.) with some of the inputs being provided by an entity that works on the background monitoring and characterizing the system and its evolution over time at operation 860.

An algorithm, simulation, or model at operation 840 may run on a distributed and decentralized basis to arrive at a possible redistribution of available resources or of priorities or soft reservations over the available resources to the various component tasks or functions of an application to reduce the gap $q_{current}$-q. This is a trainable model or algorithm, and it is intended to be a lightweight application-dependent algorithm. It may not be necessary to eliminate the QoS gap, but to move in a direction that closes the gap with a rate of adjustment that is proportional to the magnitude of the gap (e.g., the urgency measure from operation 830). A resource redistribution that is computes has to be feasible and for this the resource telemetry R is evaluated at operation 835. Various cost functions may be used over assignments of various resources and an optimized reallocation of resources may be computed at operation 850 such that a maximum benefit may be obtained while minimizing a cost (e.g., incorporating a minmax procedure). The operation 840 may be run as separate concurrent copies in various parts of the edge infrastructure. The results are global (as it computes a global reassignment) but are interpreted locally—thus each node applies the local portion of the recomputed resource assignments.

Operation 840 may use a simulation model which may be instruction driven or may be a mathematical solver that simulates the effects of different parameter changes (e.g., resource assignments). Non-procedural models may be trained neural network models, classical machine learning models like Model Trees, multi-linear regression models, principal components, Support-Vector Machines (SVMs), etc. Each of these models enable decentralized, distributed, and lightweight execution with a built-in high degree of pruning rather than adjusting the resource allocations across hundreds, possibly thousands, of resources across tens of nodes, the few variables that have the highest possible impact in the direction of intended change are isolated immediately for evaluation. The goal is progressive reduction of the quality gap.

For each performance KPI, Q, a task quality vector space, together with a function D(Q), is used to map vectors in Q to a scalar value q. Q represents a space of service quality objectives—one element per task $A_k$. The variable q represents a composite, or end-to-end quality of service objective. Because many different vectors in Q may each achieve a particular end-to-end quality objective, D(Q)→q is a subjective function. There are many different distributions of quality metrics over A1, A2, . . . , AM, that may collectively achieve a desired quality metric q for a given performance KPI. Quality is weighed with cost at operation 820. Optimization uses a trade-off equation. Quality alone may not be accurate. Either the other costs are implicitly included or they're missing. Costs may be in the form of energy, time, revenue/compensation, security, etc. A vector of quality objectives may be carried forward with one element in the vector for each KPI.

For simplicity a single dimensional KPI is used in the following example (e.g., latency per request end-to-end for application A). In the example, q is used to refer to that end-to-end quality objective for a single KPI. A mapping H: $T \times R_{next} \rightarrow T_{next}$ is used where H is a sparse mapping. For each current state T of TEEMS, it represents the achievable next state $T_{next}$ under a resource allocation $R_{next}$ across the tasks. Thus, $R_{next}$ is any resource feasible assignment from the total available set of computational resources which means it is a resource feasible allocation based on current telemetry R. Under that assignment, the expected next TEEMS value is expected to be $T_{next}$. $R_{next}$ will divide into a set of local resource allocations to each task/function that comprises A and a set of inter-task resource allocations— such as bandwidth or time to communicate information between tasks.

An alternative way of describing the above construction H is to imagine that the total performance state of various tasks is known and the likely next performance state of these tasks at the next time step (e.g., a 100 ms later, 1 second later, etc.) is to be determined if 5% more CPU cycles are given to one task A1, 7% less CPU cycles to another task A2, etc., if data flow rate between A2 and A3 is decreased by 2%, and the data flow rate between A4 and A7 in increased by 4% where the respective increases and decreases are resource feasible and are reflected in $R_{next}$. The performance state at a unit time later is what the above mapping H represents. The mappings may be ergodic (e.g., stationary with respect to time, time invariant, etc.).

While at any given time, a very large number of resource assignments $R_{next}$ is possible, various resources may be increased or decreased in known step values. The assignment space is quantized in a way that is reasonable and customary. For example, a CPU may be selected to run at frequency P0, a turbo frequency T1, etc., but not at a frequency that is higher than P0 and lower than T1. Certain ratios of resource assignments are permitted, and others are not permitted. For example, one resource assignment may allow memory bandwidth per core to be no more than 20 GigaBits per second (GBps), no more than 32 GBps, etc. Each resource is not taken in isolation, but each combination of resources has a set of permissible values. In an N-dimensional space of resources, there are various allowed and non-allowed combinations of resource values. For example, like T-shirt sizes which represent various fixed ratios of neck size to chest and to length of sleeve, etc. Between any given current state of performance T and a possible next state of performance $T_{next}$, a set of Manhattan paths are possible in this space of resource assignments. Each assignment has a measurable cost that is a function of current resource availability, and the set of next states is limited by non-reachable assignments. For example, if a particular path is pegged at 10 GBps of bandwidth, then no state $T_{next}$ is reachable from a given state T, that requires 11 GBps of bandwidth.

A defined, modest amount of computational resources (e.g., core cycles, power, available acceleration, etc.) is set aside at selected points in the infrastructure so that the procedure H may be executed without hurdles. Models, code, or implementation of decisions may be part of the QoS/Service Level Objectives (SLO)/Service Level Agreement (SLA) contracts between applications and the edge resource provisioning and load balancing mechanisms. Progress and results of resource reassignments as computed at operations 840, 845, and 850, are logged for future audits for E2E QoS compliance at operation 855. Further, these materials are also made available, along with ongoing resource and service telemetry streams (T, R), to a cloud backend service. The cloud backend service may perform (re)-training at operation 860 which may be incremental (or not) and may occasionally (e.g., hours, days, etc.) update the model/procedures in operation 840, QoS mapping function at operation 815, and the urgency function at operation 825.

Resource reassignments may be computed in a decentralized fashion across multiple edge infrastructure nodes are redistributed among the different nodes and compared for consistency. In an example, the resources may be disaggregated or a pool of resources. When inconsistency develops (e.g., as computed by a distance measure and filtered through a threshold), this gives every node a chance to see the divergence. In such cases, a reconciliation kicks in, where the best fit reassignment is computed singly at operation 845 and redistributed for taking effect in the next epoch. A high priority telemetry channel (or a virtual class of service) is provided so that telemetry information in T and R is not delayed from being distributed across the nodes. In an example, it may be based on passive sharing. For example, updates to T and R may be performed into a distributed but non-coherent file system, Remote Direct Memory Access (RDMA) accessible data structures, etc.

In an example, compensation mechanisms may be implemented and made contractual along with other items as described above. When end-to-end QoS is prohibitively costly to achieve due to temporary spikes in demand, a higher quality (e.g., a higher tier, etc.) of end-to-end service may be made available to the application or its customers or some other incentive may be delivered to them.

The QoS contract, may include the concept of real time QoS bidding that may be used on those situations where several contracts may not be achieved due to pick loads. In this situation, some of the tenants may be asked to bid for service level in real-time in order to re-negotiate the contract using a biding scheme. Thus, multiple tenants may bid for particular resources during several iterations in order to re-establish the contract based on how much a particular tenant wants to pay with respect to the others depending on their requirements.

Figure 9:
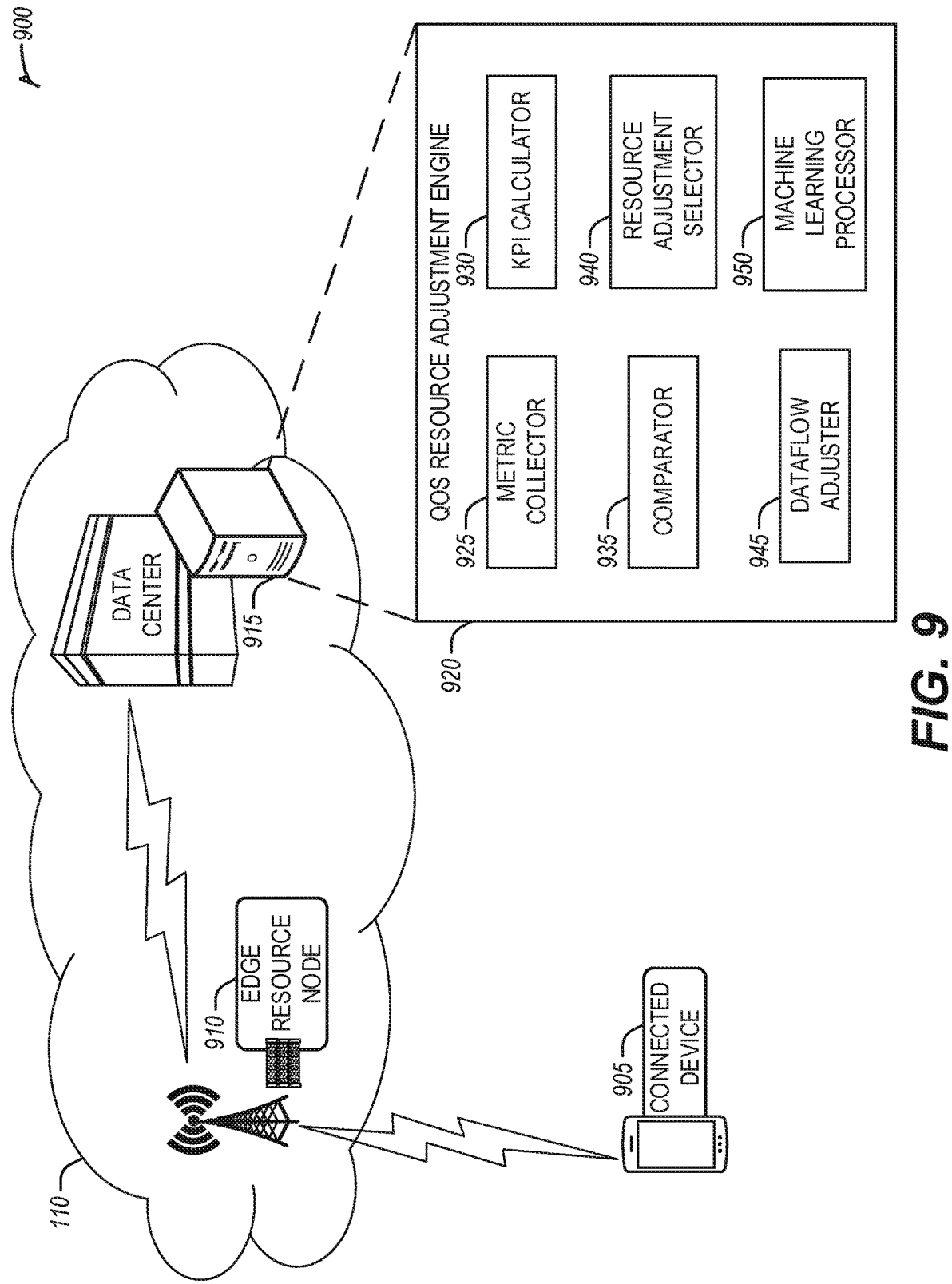
FIG. 9 illustrates an example of an environment and a system for end-to-end quality of service in edge computing environments, according to an example.

FIG. 9 illustrates an example of an environment 900 and a system 920 for end-to-end quality of service in edge computing environments, according to an example. The system 920 may provide features as described in FIGS. 6, 7, and 8. The environment 900 may include an edge cloud 110 (e.g., as described in FIG. 1, etc.) that includes a device 905 (e.g., endpoint data sources 160 as described in FIG. 1, various client endpoints 210 as described in FIG. 2, client compute node 310 as described in FIG. 3, client compute nodes 402 as described in FIG. 4, connected edge devices 562 as described in FIG. 5B, etc.) and an edge resource node 910 associated with a base station (e.g., base station 140 as described in FIG. 1, first edge node 222 or second edge node 224 as described in FIG. 2, communication base station 342 as described in FIG. 3, one or more edge gateway nodes 412 as described in FIG. 4, edge computing node 550 as described in FIG. 5B, etc.). In an example, entities of the network may operate according to a Multi-access Edge Computing (MEC) standard provided according to a European Telecommunications Standards Institute (ETSI) standard.

The edge cloud 110 may include an edge computing system. The edge computing system may include networked devices (e.g., the device 905, etc.), nodes (e.g., the edge resource node 910, etc.), platforms, etc. A server 915 (e.g., a standalone server, a cloud service, a containerized service, etc.) may be operating in a datacenter or elsewhere in the edge cloud 110. The server 915 may execute the system 920. For example, the server 915 may be executing on the edge resource node 910. In an example, the system 920 may be a QoS resource adjustment engine. The system 920 may include a variety of components including a metrics collector 925, a key performance indicator (KM) calculator 930, a comparator 935, a resource adjustment selector 940, a dataflow adjuster 945, and a machine learning processor 950.

The metrics collector 925 may obtain a set of telemetry measurements for a current dataflow between a device and a node of the edge computing system. For example, the telemetry measurements may be collected as described in FIG. 8 (e.g., operation 810). In an example, the set of telemetry measurements may be collected during a time period of delivery of the current dataflow. In an example, the set of telemetry measurements may include one or more of: a latency value, a throughput value, a frame rate, or a bit rate. The telemetry measurements may include performance values for components, tasks, functions, and microservices, etc. that are responsible for delivering a service in the edge cloud 110. Metrics collection may be at higher or reduced rate (e.g., more frequently, less frequently, etc.) depending on the type of application.

The KPI calculator 930 may calculate a KPI for the current dataflow. In an example, the KPI may indicate a current Quality of Service (QoS) for the current dataflow. For example, the KPI may be calculated as described in FIG. 8 (e.g., operation 815). In an example, a matrix of task-associated metrics may be generated using the set of telemetry measurements and the KPI may be calculated using the matrix. In an example, the set of telemetry metrics may be evaluated using a neural network to determine the KPI. The evaluation may map the set of telemetry metrics of the current dataflow to a current quality of service. The KPI may indicate an element of QoS that is to be evaluated. For example, a latency value for a connection between the device 901 and the edge resource node 910 that is delivering a service to the device 905 may be a KPI.

The comparator 935 may compare the KPI to a target KPI (e.g., as identified as described in operation 830 of FIG. 8) to determine an urgency value. For example, the urgency value may be determined as described in FIG. 8 (e.g., operation 825). The urgency value may indicate a difference between the KPI and the target KPI and how quickly a difference is to be addressed. For example, a current latency KPI may be one second and the target latency KPI may be 100 milliseconds resulting in an urgency value corresponding with a 900-millisecond difference between the KPI and target KPI. A QoS contract may indicate the difference may only exist for one minute at the 100-millisecond latency value and the urgency value may be adjusted (e.g., weighted, etc.) to reflect the difference should be resolved in ten seconds to meet the QoS. In an example, a set of dataflow delivery metrics associated with the current dataflow may be evaluated against a quality of service model corresponding to the current dataflow to generate the target KPI.

The metrics collector 925 may collect a set of resource quality metrics for resources of the network. For example, the set of resource quality metrics may be collected as described in FIG. 8 (e.g., operation 835). In an example, the set of resource quality metrics may be collected over time and represent expected operating conditions of the resources of the edge computing system. In an example, the resource quality metrics may include one or more of: a processor capacity, a bandwidth, an accelerator value, or a memory allocation. The set of resource quality metrics may indicate values for available resources between the device 905 and a service that may be used to deliver the service. For example, multiple network routs may be available to a variety of nodes that may be able to deliver the service. The set of resource quality metrics provides visibility into the capabilities of various segments of the network.

The resource adjustment selector 940 may work in conjunction with the machine learning processor 950 to evaluate the set of resource metrics with a resource adjustment model to determine available resource adjustments. For example, the available resource adjustments may be determined as described in FIG. 8 (e.g., operation 840). For example, a variety of combinations of possible network paths to various nodes may be possible for delivery of a video stream and the evaluation may determine those paths and nodes that could feasibly reduce the gap between the KPI and target KPI. In an example, the resource adjustment model may be one of: a minmax model, an algorithm, or a simulation.

The resource adjustment selector 940 may select a resource adjustment from the available resource adjustments based on an expected minimization of the urgency value. For example, the resource adjustment may be selected as described in FIG. 8 (e.g., operation 845). For example, a resource adjustment that is determined to be most likely to maximize reduction of the latency gap may be selected. In an example, a magnitude of the selected resource adjustment may be modified based on the urgency value. In an example, available resource values may be identified for nodes associated with tasks corresponding to the resource adjustment. The available resource values may be compared to resource values specified by the available resource adjustment and the resource adjustment may be selected at least in part based on an available resource value being compatible with a resource value of the resource adjustment.

The dataflow adjuster 945 may modify delivery of the current dataflow using the selected resource adjustment. For example, the dataflow delivery may be adjusted as described in FIG. 8 (e.g., operation 850). For example, the resource adjustment may include a route change for a video stream requested by the device 905 that has a lower latency value and the current stream of the live video stream may be transferred to the new route. In an example, a service corresponding to a resource may be identified that is a subject of the resource adjustment and an adjustment value may be determined for the resource adjustment based on the urgency value. The modification of the delivery of the current dataflow may include transmission of a command to a service provider of the service to modify processing of the current dataflow based on the adjustment value.

Addition KPIs may be evaluated and additional resource adjustments may be made to adjust delivery of the dataflow to converge the dataflow to the target KPIs of the QoS contract. Thus, additional passes for the current time period of service delivery and future time periods may be evaluated to ensure ongoing delivery of the service to meet QoS objectives.

Figure 10:
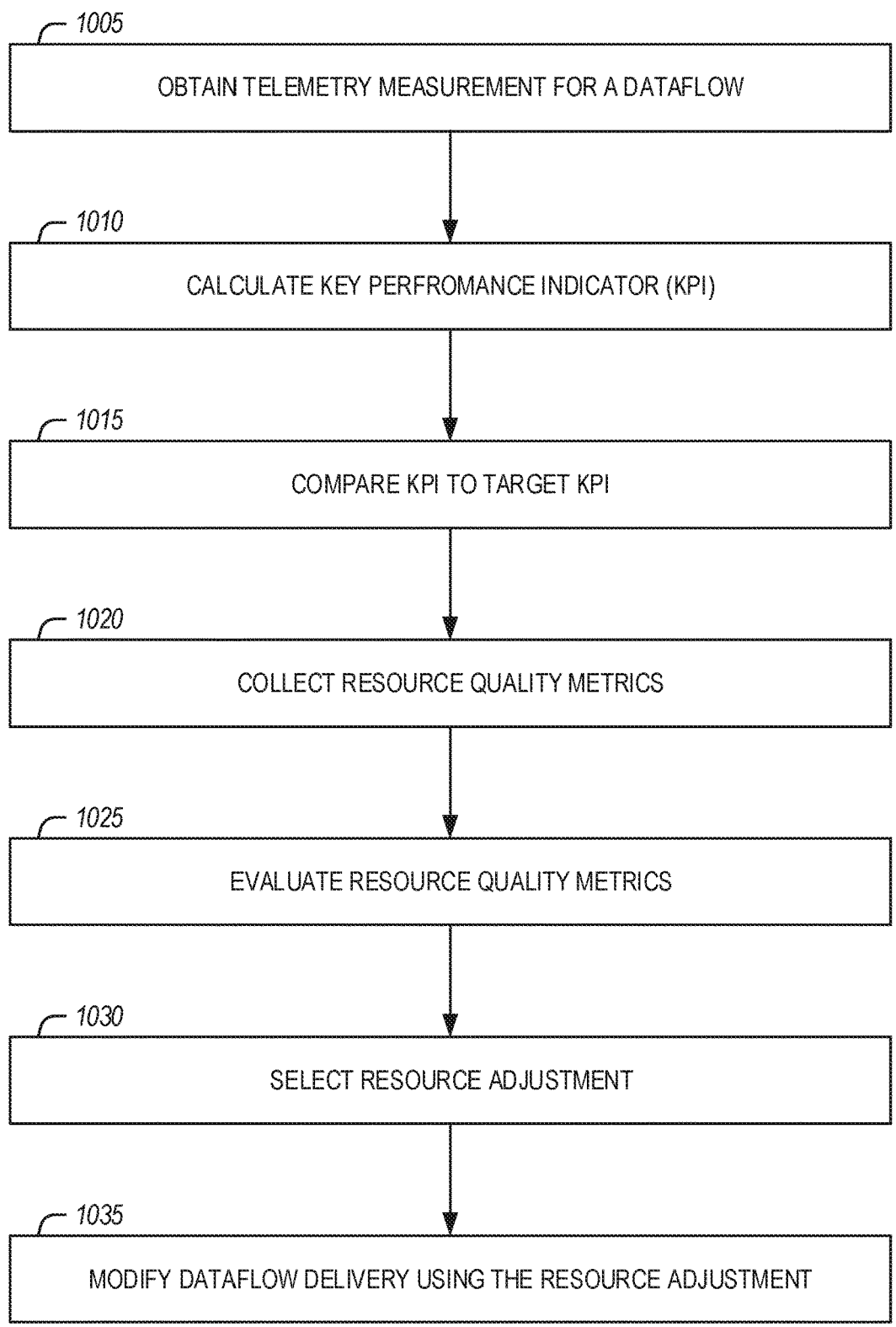
FIG. 10 illustrates an example of a method for end-to-end quality of service in edge computing environments, according to an example.

FIG. 10 illustrates an example of a method 1000 for end-to-end quality of service in edge computing environments, according to an example. The method 100 may provide features as described in FIGS. 6, 7, 8, and 9.

A set of telemetry measurements may be obtained (e.g., by the metrics collector 925 as described in FIG. 9, etc.) for a current dataflow between a device and a node of the edge computing system (e.g., at operation 1005). In an example, the set of telemetry measurements may be collected during a time period of delivery of the current dataflow. In an example, the set of telemetry measurements may include one or more of: a latency value, a throughput value, a frame rate, or a bit rate.

A key performance indicator (KPI) may be calculated (e.g., by the KPI calculator 930 as described in FIG. 9, etc.) for the current dataflow (e.g., at operation 1010). In an example, the KPI may indicate a current Quality of Service (QoS) for the current dataflow. In an example, a matrix of task-associated metrics may be generated using the set of telemetry measurements and the KPI may be calculated using the matrix. In an example, the set of telemetry metrics may be evaluated using a neural network to determine the KPI. The evaluation may map the set of telemetry metrics of the current dataflow to a current quality of service.

The KPI may be compared (e.g., by the comparator 935 as described in FIG. 9, etc.) to a target KPI to determine an urgency value (e.g., at operation 1015). In an example, a set of dataflow delivery metrics associated with the current dataflow may be evaluated against a quality of service model corresponding to the current dataflow to generate the target KPI.

A set of resource quality metrics may be collected (e.g., by the metrics collector 925 as described in FIG. 9, etc.) for resources of the network (e.g., at operation 1020). In an example, the set of resource quality metrics may be collected over time and represent expected operating conditions of the resources of the edge computing system. In an example, the resource quality metrics may include one or more of: a processor capacity, a bandwidth, an accelerator value, or a memory allocation.

The set of resource metrics may be evaluated (e.g., by the resource adjustment selector 940 in conjunction with the machine learning processor 950 as described in FIG. 9, etc.) with a resource adjustment model to determine available resource adjustments (e.g., at operation 1025). In an example, the resource adjustment model may be one of: a minmax model, an algorithm, or a simulation.

A resource adjustment may be selected (e.g., by the resource adjustment selector 940 as described in FIG. 9, etc.) from the available resource adjustments based on an expected minimization of the urgency value (e.g., at operation 1030). In an example, a magnitude of the selected resource adjustment may be modified based on the urgency value. In an example, available resource values may be identified for nodes associated with tasks corresponding to the resource adjustment. The available resource values may be compared to resource values specified by the available resource adjustment and the resource adjustment may be selected at least in part based on an available resource value being compatible with a resource value of the resource adjustment.

Delivery of the current dataflow may be modified (e.g., by the dataflow adjuster 945 as described in FIG. 9, etc.) using the selected resource adjustment (e.g., at operation 1035). In an example, a service corresponding to a resource may be identified that is a subject of the resource adjustment and an adjustment value may be determined for the resource adjustment based on the urgency value. The modification of the delivery of the current dataflow may include transmission of a command to a service provider of the service to modify processing of the current dataflow based on the adjustment value.

ADDITIONAL NOTES & EXAMPLES

Example 1 is a method for end-to-end quality dataflow management in a network of an edge computing system, comprising: obtaining a set of telemetry measurements for an ongoing dataflow between a device and a node of the edge computing system; calculating a current key performance indicator (KPI) for the ongoing dataflow; comparing the current KPI to a target KPI to determine an urgency value; collecting a set of resource quality metrics for resources of the network; evaluating the set of resource quality metrics with a resource adjustment model to determine available resource adjustments; selecting a resource adjustment from the available resource adjustments based on an expected minimization of the urgency value; and modifying delivery of the ongoing dataflow using the selected resource adjustment.

In Example 2, the subject matter of Example 1 includes, wherein the method is implemented in a client device.

In Example 3, the subject matter of Examples 1-2 includes, wherein the method is implemented in an edge computing node.

In Example 4, the subject matter of Examples 1-3 includes, wherein the method is implemented in a service executing on the network.

In Example 5, the subject matter of Examples 1-4 includes, wherein the set of telemetry measurements is collected during a time period of delivery of the ongoing dataflow, wherein each telemetry measurement of the set of telemetry measurements is a performance indicator for a delivery component of the current dataflow.

In Example 6, the subject matter of Examples 1-5 includes, wherein the current KPI indicates a current Service Level Objective (SLO) for the ongoing dataflow.

In Example 7, the subject matter of Examples 1-6 includes, modifying a magnitude of the selected resource adjustment based on the urgency value.

In Example 8, the subject matter of Examples 1-7 includes, wherein the resource adjustment model is one of: a minmax model, an algorithm, or a simulation.

In Example 9, the subject matter of Examples 1-8 includes, identifying a service corresponding to a resource that is a subject of the resource adjustment; and determining an adjustment value for the resource adjustment based on the urgency value, wherein modifying the delivery of the ongoing dataflow includes transmitting a command to a service provider of the service to modify processing of the ongoing dataflow based on the adjustment value.

In Example 10, the subject matter of Examples 1-9 includes, generating a matrix of task-associated metrics using the set of telemetry measurements, wherein the current KPI is calculated using the matrix.

In Example 11, the subject matter of Examples 1-10 includes, evaluating a set of dataflow delivery metrics associated with the ongoing dataflow against a quality of service model corresponding to the ongoing dataflow to generate the target KPI.

In Example 12, the subject matter of Examples 1-11 includes, evaluating the set of telemetry metrics using a neural network to determine the current KPI, wherein the evaluation maps the set of telemetry metrics of the ongoing dataflow to a current quality of service.

In Example 13, the subject matter of Examples 1-12 includes, wherein selecting the resource adjustment from the available resource adjustments further comprises: identifying available resource values for nodes associated with tasks corresponding to the resource adjustment; comparing the available resource values to resource values specified by the available resource adjustment; and selecting the resource adjustment at least in part based on an available resource value being compatible with a resource value of the resource adjustment.

In Example 14, the subject matter of Examples 1-13 includes, wherein the set of resource quality metrics are collected over time and represent expected operating conditions of the resources of the network.

In Example 15, the subject matter of Examples 1-14 includes, wherein the set of telemetry measurements include one or more of: a latency value, a throughput value, a frame rate, or a bit rate.

In Example 16, the subject matter of Examples 1-15 includes, wherein the resource quality metrics include one or more of: a processor capacity, a bandwidth, an accelerator value, or a memory allocation.

Example 17 is at least one machine-readable medium including instructions or stored data which may be configured into instructions that, when configured and executed by a machine, cause the machine to perform any method of Examples 1-16.

Example 18 is a system comprising means to perform any method of Examples 1-16.

Example 19 is a system for end-to-end quality dataflow management in a network of an edge computing system, comprising: at least one processor; and memory including instructions that, when executed by the at least one processor, cause the at least one processor to perform operations to: obtain a set of telemetry measurements for an ongoing dataflow between a device and a node of the edge computing system; calculate a current key performance indicator (KPI) for the ongoing dataflow; compare the current KPI to a target KPI to determine an urgency value; collect a set of resource quality metrics for resources of the network; evaluate the set of resource quality metrics with a resource adjustment model to determine available resource adjustments; select a resource adjustment from the available resource adjustments based on an expected minimization of the urgency value; and modify delivery of the ongoing dataflow using the selected resource adjustment.

In Example 20, the subject matter of Example 19 includes, wherein the set of telemetry measurements is collected during a time period of delivery of the ongoing dataflow, wherein each telemetry measurement of the set of telemetry measurements is a performance indicator for a delivery component of the current dataflow.

In Example 21, the subject matter of Examples 19-20 includes, wherein the current KPI indicates a current Service Level Objective (SLO) for the ongoing dataflow.

In Example 22, the subject matter of Examples 19-21 includes, the memory further comprising instructions that cause the at least one processor to modify a magnitude of the selected resource adjustment based on the urgency value.

In Example 23, the subject matter of Examples 19-22 includes, wherein the resource adjustment model is one of: a minmax model, an algorithm, or a simulation.

In Example 24, the subject matter of Examples 19-23 includes, the memory further comprising instruction that cause the at least one processor to perform operations to: identify a service corresponding to a resource that is a subject of the resource adjustment; and determine an adjustment value for the resource adjustment based on the urgency value, wherein the modification of the delivery of the ongoing dataflow includes transmission of a command to a service provider of the service to modify processing of the ongoing dataflow based on the adjustment value.

In Example 25, the subject matter of Examples 19-24 includes, the memory further comprising instructions that cause the at least one processor to generate a matrix of task-associated metrics using the set of telemetry measurements, wherein the current KPI is calculated using the matrix.

In Example 26, the subject matter of Examples 19-25 includes, the memory further comprising instructions that cause the at least one processor to evaluate a set of dataflow delivery metrics associated with the ongoing dataflow against a quality of service model that corresponds to the ongoing dataflow to generate the target KPI.

In Example 27, the subject matter of Examples 19-26 includes, the memory further comprising instructions that cause the at least one processor to evaluate the set of telemetry metrics using a neural network to determine the current KPI, wherein the evaluation maps the set of telemetry metrics of the ongoing dataflow to a current quality of service.

In Example 28, the subject matter of Examples 19-27 includes, wherein the instruction to select the resource adjustment from the available resource adjustments further comprises instructions that cause the at least one processor to perform operations to: identify available resource values for nodes associated with tasks that correspond to the resource adjustment; compare the available resource values to resource values specified by the available resource adjustment; and select the resource adjustment at least in part based on an available resource value being compatible with a resource value of the resource adjustment.

In Example 29, the subject matter of Examples 19-28 includes, wherein the set of resource quality metrics are collected over time and represent expected operating conditions of the resources of the network.

In Example 30, the subject matter of Examples 19-29 includes, wherein the set of telemetry measurements include one or more of: a latency value, a throughput value, a frame rate, or a bit rate.

In Example 31, the subject matter of Examples 19-30 includes, wherein the resource quality metrics include one or more of: a processor capacity, a bandwidth, an accelerator value, or a memory allocation.

Example 32 is at least one non-transitory machine-readable medium including instructions for end-to-end quality dataflow management in a network of an edge computing system that, when executed by at least one processor, cause the at least one processor to perform operations to: obtain a set of telemetry measurements for an ongoing dataflow between a device and a node of the edge computing system; calculate a current key performance indicator (KPI) for the ongoing dataflow; compare the current KPI to a target KPI to determine an urgency value; collect a set of resource quality metrics for resources of the network; evaluate the set of resource quality metrics with a resource adjustment model to determine available resource adjustments; select a resource adjustment from the available resource adjustments based on an expected minimization of the urgency value; and modify delivery of the ongoing dataflow using the selected resource adjustment.

In Example 33, the subject matter of Example 32 includes, wherein the set of telemetry measurements is collected during a time period of delivery of the ongoing dataflow, wherein each telemetry measurement of the set of telemetry measurements is a performance indicator for a delivery component of the current dataflow.

In Example 34, the subject matter of Examples 32-33 includes, wherein the current KPI indicates a current Service Level Objective (SLO) for the ongoing dataflow.

In Example 35, the subject matter of Examples 32-34 includes, instructions that cause the at least one processor to modify a magnitude of the selected resource adjustment based on the urgency value.

In Example 36, the subject matter of Examples 32-35 includes, wherein the resource adjustment model is one of: a minmax model, an algorithm, or a simulation.

In Example 37, the subject matter of Examples 32-36 includes, instruction that cause the at least one processor to perform operations to: identify a service corresponding to a resource that is a subject of the resource adjustment; and determine an adjustment value for the resource adjustment based on the urgency value, wherein the modification of the delivery of the ongoing dataflow includes transmission of a command to a service provider of the service to modify processing of the ongoing dataflow based on the adjustment value.

In Example 38, the subject matter of Examples 32-37 includes, instructions that cause the at least one processor to generate a matrix of task-associated metrics using the set of telemetry measurements, wherein the current KPI is calculated using the matrix.

In Example 39, the subject matter of Examples 32-38 includes, instructions that cause the at least one processor to evaluate a set of dataflow delivery metrics associated with the ongoing dataflow against a quality of service model that corresponds to the ongoing dataflow to generate the target KM.

In Example 40, the subject matter of Examples 32-39 includes, instructions that cause the at least one processor to evaluate the set of telemetry metrics using a neural network to determine the current KPI, wherein the evaluation maps the set of telemetry metrics of the ongoing dataflow to a current quality of service.

In Example 41, the subject matter of Examples 32-40 includes, wherein the instruction to select the resource adjustment from the available resource adjustments further comprises instructions that cause the at least one processor to perform operations to: identify available resource values for nodes associated with tasks that correspond to the resource adjustment; compare the available resource values to resource values specified by the available resource adjustment; and select the resource adjustment at least in part based on an available resource value being compatible with a resource value of the resource adjustment.

In Example 42, the subject matter of Examples 32-41 includes, wherein the set of resource quality metrics are collected over time and represent expected operating conditions of the resources of the network.

In Example 43, the subject matter of Examples 32-42 includes, wherein the set of telemetry measurements include one or more of: a latency value, a throughput value, a frame rate, or a bit rate.

In Example 44, the subject matter of Examples 32-43 includes, wherein the resource quality metrics include one or more of: a processor capacity, a bandwidth, an accelerator value, or a memory allocation.

Example 45 is a system for end-to-end quality dataflow management in a network of an edge computing system, comprising: means for obtaining a set of telemetry measurements for an ongoing dataflow between a device and a node of the edge computing system; means for calculating a current key performance indicator (KPI) for the ongoing dataflow; means for comparing the current KPI to a target KPI to determine an urgency value; means for collecting a set of resource quality metrics for resources of the network; means for evaluating the set of resource quality metrics with a resource adjustment model to determine available resource adjustments; means for selecting a resource adjustment from the available resource adjustments based on an expected minimization of the urgency value; and means for modifying delivery of the ongoing dataflow using the selected resource adjustment.

In Example 46, the subject matter of Example 45 includes, wherein the set of telemetry measurements is collected during a time period of delivery of the ongoing dataflow, wherein each telemetry measurement of the set of telemetry measurements is a performance indicator for a delivery component of the current dataflow.

In Example 47, the subject matter of Examples 45-46 includes, wherein the current KPI indicates a current Service Level Objective (SLO) for the ongoing dataflow.

In Example 48, the subject matter of Examples 45-47 includes, means for modifying a magnitude of the selected resource adjustment based on the urgency value.

In Example 49, the subject matter of Examples 45-48 includes, wherein the resource adjustment model is one of: a minmax model, an algorithm, or a simulation.

In Example 50, the subject matter of Examples 45-49 includes, means for identifying a service corresponding to a resource that is a subject of the resource adjustment; and means for determining an adjustment value for the resource adjustment based on the urgency value, wherein the means for modifying the delivery of the ongoing dataflow includes means for transmitting a command to a service provider of the service to modify processing of the ongoing dataflow based on the adjustment value.

In Example 51, the subject matter of Examples 45-50 includes, means for generating a matrix of task-associated metrics using the set of telemetry measurements, wherein the current KPI is calculated using the matrix.

In Example 52, the subject matter of Examples 45-51 includes, means for evaluating a set of dataflow delivery metrics associated with the ongoing dataflow against a quality of service model corresponding to the ongoing dataflow to generate the target KPI.

In Example 53, the subject matter of Examples 45-52 includes, means for evaluating the set of telemetry metrics using a neural network to determine the current KPI, wherein the evaluation maps the set of telemetry metrics of the ongoing dataflow to a current quality of service.

In Example 54, the subject matter of Examples 45-53 includes, wherein the means for selecting the resource adjustment from the available resource adjustments further comprises: means for identifying available resource values for nodes associated with tasks corresponding to the resource adjustment; means for comparing the available resource values to resource values specified by the available resource adjustment; and means for selecting the resource adjustment at least in part based on an available resource value being compatible with a resource value of the resource adjustment.

In Example 55, the subject matter of Examples 45-54 includes, wherein the set of resource quality metrics are collected over time and represent expected operating conditions of the resources of the network.

In Example 56, the subject matter of Examples 45-55 includes, wherein the set of telemetry measurements include one or more of: a latency value, a throughput value, a frame rate, or a bit rate.

In Example 57, the subject matter of Examples 45-56 includes, wherein the resource quality metrics include one or more of: a processor capacity, a bandwidth, an accelerator value, or a memory allocation.

Example 58 may include one or more computer-readable storage media comprising data to cause an electronic device, upon loading, execution, configuration, or provisioning of the data by one or more processors or electronic circuitry of the electronic device, to perform one or more elements of a method described in or related to any of Examples 1-57, or any other method or process described herein.

Example 59 is an apparatus comprising means to implement of any of Examples 1-57.

Example 60 is a system to implement of any of Examples 1-57.

Example 61 is a method to implement of any of Examples 1-57.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed. Description, with each claim standing on its own as a separate embodiment. The scope of the embodiments should be determined with reference to the appended claims, along with the full scope of equivalents to which such claims are entitled.

What is claimed is:

1. A system for end-to-end quality dataflow management in a network of an edge computing system, comprising:
at least one processor; and
memory including instructions that, when executed by the at least one processor, cause the at least one processor to perform operations to:
obtain a set of telemetry measurements for an ongoing dataflow between a device and a node of the edge computing system;
calculate a current key performance indicator (KPI) for the ongoing dataflow;
compare the current KPI to a target KPI to determine an urgency value;
collect a set of resource quality metrics for resources of the network;
evaluate the set of resource quality metrics with a resource adjustment model to determine available resource adjustments;
select a resource adjustment from the available resource adjustments based on an expected minimization of the urgency value; and
modify delivery of the ongoing dataflow using the selected resource adjustment.

2. The system of claim 1, wherein the set of telemetry measurements is collected during a time period of delivery of the ongoing dataflow, wherein each telemetry measurement of the set of telemetry measurements is a performance indicator for a delivery component of the current dataflow.

3. The system of claim 1, the memory further comprising instruction that cause the at least one processor to perform operations to:
identify a service corresponding to a resource that is a subject of the resource adjustment; and
determine an adjustment value for the resource adjustment based on the urgency value, wherein the modification of the delivery of the ongoing dataflow includes transmission of a command to a service provider of the service to modify processing of the ongoing dataflow based on the adjustment value.

4. The system of claim 1, the memory further comprising instructions that cause the at least one processor to generate a matrix of task-associated metrics using the set of telemetry measurements, wherein the current KPI is calculated using the matrix.

5. The system of claim 1, the memory further comprising instructions that cause the at least one processor to evaluate a set of dataflow delivery metrics associated with the ongoing dataflow against a quality of service model that corresponds to the ongoing dataflow to generate the target KPI.

6. The system of claim 1, the memory further comprising instructions that cause the at least one processor to evaluate the set of telemetry metrics using a neural network to determine the current KPI, wherein the evaluation maps the set of telemetry metrics of the ongoing dataflow to a current quality of service.

7. The system of claim 1, wherein the instruction to select the resource adjustment from the available resource adjustments further comprises instructions that cause the at least one processor to perform operations to:
identify available resource values for nodes associated with tasks that correspond to the resource adjustment;
compare the available resource values to resource values specified by the available resource adjustment; and
select the resource adjustment at least in part based on an available resource value being compatible with a resource value of the resource adjustment.

8. At least one non-transitory machine-readable medium including instructions for end-to-end quality dataflow management in a network of an edge computing system that, when executed by at least one processor, cause the at least one processor to perform operations to:
obtain a set of telemetry measurements for an ongoing dataflow between a device and a node of the edge computing system;
calculate a current key performance indicator (KPI) for the ongoing dataflow;
compare the current KPI to a target KPI to determine an urgency value;
collect a set of resource quality metrics for resources of the network;
evaluate the set of resource quality metrics with a resource adjustment model to determine available resource adjustments;
select a resource adjustment from the available resource adjustments based on an expected minimization of the urgency value; and
modify delivery of the ongoing dataflow using the selected resource adjustment.

9. The at least one non-transitory machine-readable medium of claim 8, wherein the set of telemetry measurements is collected during a time period of delivery of the ongoing dataflow, wherein each telemetry measurement of the set of telemetry measurements is a performance indicator for a delivery component of the current dataflow.

10. The at least one non-transitory machine-readable medium of claim 8, wherein the resource adjustment model is one of: a minmax model, an algorithm, or a simulation.

11. The at least one non-transitory machine-readable medium of claim 8, further comprising instruction that cause the at least one processor to perform operations to:
identify a service corresponding to a resource that is a subject of the resource adjustment; and
determine an adjustment value for the resource adjustment based on the urgency value, wherein the modification of the delivery of the ongoing dataflow includes transmission of a command to a service provider of the service to modify processing of the ongoing dataflow based on the adjustment value.

12. The at least one non-transitory machine-readable medium of claim 8, further comprising instructions that cause the at least one processor to generate a matrix of task-associated metrics using the set of telemetry measurements, wherein the current KPI is calculated using the matrix.

13. The at least one non-transitory machine-readable medium of claim 8, further comprising instructions that cause the at least one processor to evaluate the set of telemetry metrics using a neural network to determine the current KPI, wherein the evaluation maps the set of telemetry metrics of the ongoing dataflow to a current quality of service.

14. The at least one non-transitory machine-readable medium of claim 8, wherein the instruction to select the resource adjustment from the available resource adjustments further comprises instructions that cause the at least one processor to perform operations to:

identify available resource values for nodes associated with tasks that correspond to the resource adjustment;

compare the available resource values to resource values specified by the available resource adjustment; and select the resource adjustment at least in part based on an available resource value being compatible with a resource value of the resource adjustment.

15. A method for end-to-end quality dataflow management in a network of an edge computing system, comprising:

obtaining a set of telemetry measurements for an ongoing dataflow between a device and a node of the edge computing system;

calculating a current key performance indicator (KM) for the ongoing dataflow;

comparing the current KPI to a target KPI to determine an urgency value;

collecting a set of resource quality metrics for resources of the network;

evaluating the set of resource quality metrics with a resource adjustment model to determine available resource adjustments;

selecting a resource adjustment from the available resource adjustments based on an expected minimization of the urgency value; and modifying delivery of the ongoing dataflow using the selected resource adjustment.

16. The method of claim 15, wherein the set of telemetry measurements is collected during a time period of delivery of the ongoing dataflow, wherein each telemetry measurement of the set of telemetry measurements is a performance indicator for a delivery component of the current dataflow.

17. The method of claim 15, further comprising:

identifying a service corresponding to a resource that is a subject of the resource adjustment; and determining an adjustment value for the resource adjustment based on the urgency value, wherein modifying the delivery of the ongoing dataflow includes transmitting a command to a service provider of the service to modify processing of the ongoing dataflow based on the adjustment value.

18. The method of claim 15, further comprising generating a matrix of task-associated metrics using the set of telemetry measurements, wherein the current KPI is calculated using the matrix.

19. The method of claim 15, further comprising evaluating a set of dataflow delivery metrics associated with the ongoing dataflow against a quality of service model corresponding to the ongoing dataflow to generate the target KPI.

20. The method of claim 15, further comprising evaluating the set of telemetry metrics using a neural network to determine the current KPI, wherein the evaluation maps the set of telemetry metrics of the ongoing dataflow to a current quality of service.

21. The method of claim 15, wherein selecting the resource adjustment from the available resource adjustments further comprises:

identifying available resource values for nodes associated with tasks corresponding to the resource adjustment;

comparing the available resource values to resource values specified by the available resource adjustment; and selecting the resource adjustment at least in part based on an available resource value being compatible with a resource value of the resource adjustment.

* * * * *